(12) United States Patent
Yamamoto et al.

(10) Patent No.: US 12,047,957 B2
(45) Date of Patent: *Jul. 23, 2024

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America

( * ) Notice: Subject to any disclaimer, the term of this patent is extended or adjusted under 35 U.S.C. 154(b) by 0 days.

This patent is subject to a terminal disclaimer.

(21) Appl. No.: 18/179,077

(22) Filed: Mar. 6, 2023

(65) Prior Publication Data

US 2023/0209558 A1    Jun. 29, 2023

Related U.S. Application Data

(63) Continuation of application No. 16/614,393, filed as application No. PCT/JP2018/015791 on Apr. 17, 2018, now Pat. No. 11,665,693.

(30) Foreign Application Priority Data

Jun. 15, 2017  (JP) .................................. 2017-117641
Nov. 14, 2017  (JP) .................................. 2017-218916

(51) Int. Cl.
*H04W 72/21*     (2023.01)
*H04L 5/00*      (2006.01)
(Continued)

(52) U.S. Cl.
CPC ........... *H04W 72/21* (2023.01); *H04L 5/0051* (2013.01); *H04L 27/2614* (2013.01); *H04W 72/0453* (2013.01)

(58) Field of Classification Search
CPC ......... H04W 72/1284; H04W 72/0413; H04W 72/0453; H04W 72/02; H04W 72/04; H04L 5/0051; H04L 27/2614; H04L 1/1664

See application file for complete search history.

(56) References Cited

U.S. PATENT DOCUMENTS

2010/0046460 A1   2/2010 Kwak et al.
2016/0337157 A1*  11/2016 Papasakellariou .... H04L 1/1893
(Continued)

FOREIGN PATENT DOCUMENTS

CN   101682414 A   3/2010
EP   2613458 A2    7/2013
(Continued)

OTHER PUBLICATIONS

The Indian OA dated Jun. 9, 2023 for the related Indian Patent Application No. 202248008627. (5 pages).
(Continued)

*Primary Examiner* — Yu-Wen Chang
(74) *Attorney, Agent, or Firm* — Seed IP Law Group LLP

(57) ABSTRACT

In a terminal, a signal allocation unit allocates uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of the terminal. A transmitting unit transmits the uplink control information.

16 Claims, 14 Drawing Sheets

(51) Int. Cl.
*H04L 27/26* (2006.01)
*H04W 72/0453* (2023.01)

(56) References Cited

U.S. PATENT DOCUMENTS

| | | |
|---|---|---|
| 2017/0273071 A1 | 9/2017 | Nogami et al. |
| 2018/0176909 A1 | 6/2018 | Wikstrom et al. |
| 2018/0220415 A1 | 8/2018 | Yin et al. |
| 2018/0310257 A1 | 10/2018 | Papasakellariou et al. |
| 2018/0332624 A1 | 11/2018 | Patel et al. |
| 2019/0058552 A1 | 2/2019 | Yang et al. |
| 2019/0140876 A1 | 5/2019 | Yoshimura et al. |
| 2019/0140878 A1* | 5/2019 | Takeda .................. H04W 72/21 |
| 2019/0174430 A1 | 6/2019 | Gao et al. |
| 2019/0230596 A1 | 7/2019 | Falconetti et al. |
| 2019/0246416 A1 | 8/2019 | Park et al. |
| 2020/0067680 A1 | 2/2020 | Nayeb Nazar et al. |
| 2020/0092876 A1 | 3/2020 | Cho et al. |
| 2020/0136777 A1 | 4/2020 | He et al. |
| 2020/0367254 A1 | 11/2020 | Han et al. |
| 2022/0070906 A1 | 3/2022 | Wang et al. |

FOREIGN PATENT DOCUMENTS

| | | |
|---|---|---|
| EP | 3624368 A1 | 3/2020 |
| WO | WO 2018175764 A1 | 9/2018 |
| WO | WO 2018207296 A1 | 11/2018 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)," 3GPP TS 36.211 V13.4.0, Dec. 2016, 171 pages.

3GPP, "3rd Generation Partnership Project; Technical Specification Group Radio Access Network; Evolved Universal Terrestrial Radio Access (E-UTRA); Multiplexing and channel coding (Release 13)," 3GPP TS 36.212 V13.4.0, Dec. 2016, 140 pages.

3GPP, "3rd Generation Partnership Project; Technical Specification Group Radio Access Network; Evolved Universal Terrestrial Radio Access (E-UTRA); Physical layer procedures (Release 13)," 3GPP TS 36.213 V13.4.0, Dec. 2016, 387 pages.

Ericsson, "On the Design of 1-Symbol PUCCH for 1-2 bits UCI," R1-1709080, Agenda Item: 7.1.3.2.1, 3GPP TSG-RAN WG1 #89, Hangzhou, China, May 15-19, 2017, 9 pages.

Intel Corporation, "Short PUCCH formats for 1~2 UCI bits," R1-1707387, Agenda Item: 7.1.3.2.1, 3GPP TSG RAN WG1 Meeting #89, Hangzhou, China, May 15-19, 2017, 5 pages.

International Search Report, mailed Jul. 3, 2018, for corresponding International Application No. PCT/JP2018/015791, 8 pages.

MediaTek Inc., "Performance evaluation on channel structure of short PUCCH for 1 or 2 bits UCI," R1-1707842, Agenda Item: 7.1.3.2.1, 3GPP TSG RAN WG1 Meeting #89, Hangzhou, P.R. China, May 15-19, 2017, 8 pages.

Motorola Mobility, Lenovo, "Short PUCCH structure," R1-1708308, Agenda Item: 7.1.3.2.1, 3GPP TSG RAN WG1 Meeting #89, Hangzhou, P.R. China, May 15-19, 2017, 7 pages.

Nazar et al., "Methods, Systems, and Apparatus for Scheduling Request Transmission in Uplink," U.S. Appl. No. 62/500,772, filed May 3, 2017, 24 pages.

NEC, "Design for structure of PUCCH in short duration," R1-1707812, Agenda Item. 7.1.3.2.1, 3GPP TSG RAN WG1 Meeting #89, Hangzhou, P.R. China, May 15-19, 2017, 3 pages.

Nokia et al., "Multiplexing between SR and other UCI on short Pucch," R1-1708511, Agenda Item: 7.1.3.2.1, 3GPP TSG RAN WG1#89, Hangzhou, P.R. China, May 15-19, 2017, 3 pages.

NTT Docomo, Inc., "Sequence-based PUCCH for UCI of up to 2 bits," R1-1708470, Agenda Item: 7.1.3.2.1, 3GPP TSG RAN WG1 Meeting #89, Hangzhou, P.R. China, May 15-19, 2017. (11 pages).

Panasonic, "Discussion on multiplexing of SR and 1 or 2 bits HARQ-ACK," R1-1708090, Agenda Item: 7.1.3.2.4, 3GPP TSG RAN WG1 Meeting #89, Hangzhou, P.R. China, May 15-19, 2017, 2 pages.

Papasakellariou, "Transmission of Scheduling Requests," U.S. Appl. No. 62/490,835, filed Apr. 27, 2017, 29 pages.

Park et al., "Scheduling Request in New Rat," U.S. Appl. No. 62/501,060, filed May 3, 2017, 16 pages.

Partial European Search Report mailed Jun. 12, 2020, for related European Patent Application No. 18817264.7. (19 pages).

Samsung, "Resource allocation for PUCCH with SR", R1-1708011, Agenda Item: 7.1.3.2.3, 3GPP TSG RAN WG1 Meeting #89, Hangzhou, China, May 15-19, 2017, 5 pages.

Singapore Written Opinion dated Mar. 16, 2021 for the related Singapore Patent Application No. 11201911635R, 9 pages.

Zte, "NR short PUCCH structure for up to 2 bit UCI," R1-1707168, Agenda Item: 7.1.3.2.1, 3GPP TSG RAN WG1 Meeting #89, Hangzhou, P.R. China, May 15-19, 2017. (10 pages).

* cited by examiner

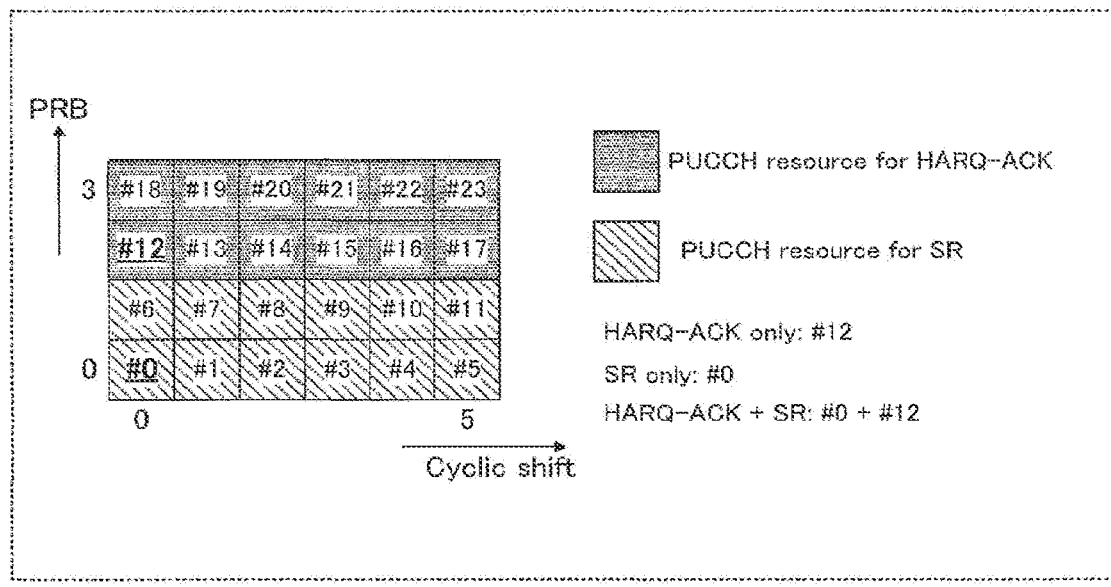
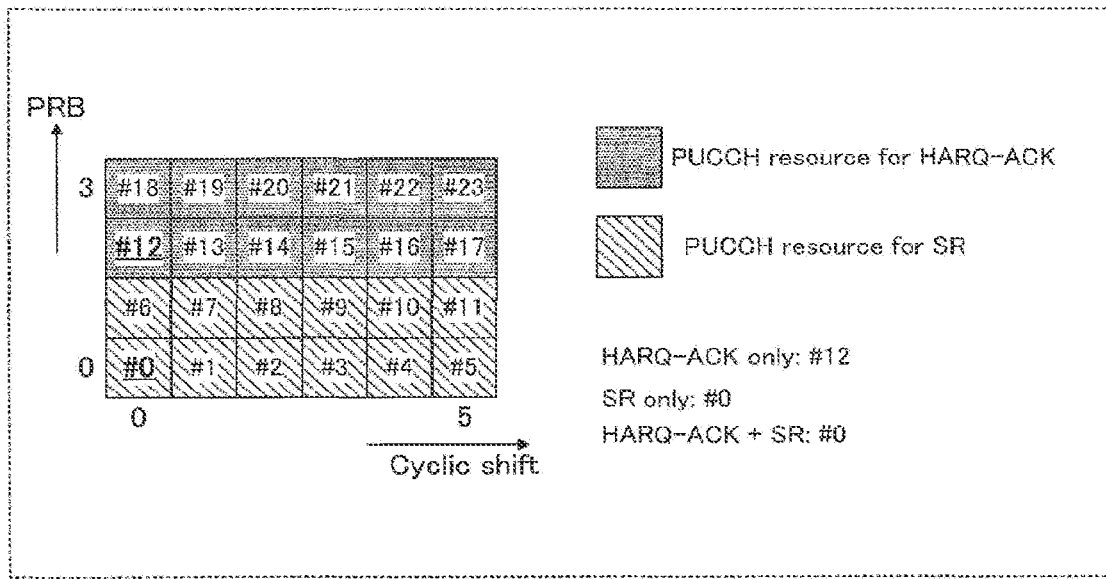

FIG. 7

|  | No. of sequence simultaneously transmitted | | Required No. of sequence per UE |
|---|---|---|---|
|  | HARQ-ACK only / SR only | HARQ-ACK + SR | |
| Option 1-1 | 2 | 4 | 4 (or 3.5) |
| Option 1-2 | | 2 | 4 |
| Option 4-1 | 1 | 2 | 3 (1 bit), 5 (2 bits) |
| Option 4-2 | | 1 | 4 (1 bit), 8 (2 bits) |

|  | No. of sequence simultaneously transmitted ||
|  | HARQ-ACK only / SR only | HARQ-ACK + SR |
| --- | --- | --- |
| Option 1-1 | 2 | 4 |
| Option 1-2 | 2 | 2 |
| Option 4-1 | 1 | 2 |
| Option 4-2 | 1 | 1 |

FIG. 13

|  | No. of sequence simultaneously transmitted ||
|  | HARQ-ACK only / SR only | HARQ-ACK + SR |
| --- | --- | --- |
| Option 1-1 | 2 | 4 |
| Option 1-2 | 2 | 2 |
| Option 4-1 | 1 | 2 |
| Option 4-2 | 1 | 1 |

| | No. of sequence simultaneously transmitted | | Required No. of sequence per UE |
|---|---|---|---|
| | HARQ-ACK only / SR only | HARQ-ACK + SR | |
| Option 1-1 | 2 | 4 | 4 (or 3.5) |
| Option 1-2 | | 2 | 4 |
| Option 4-1 | 1 | 2 | 3 (1 bit), 5 (2 bits) |
| Option 4-2 | | 1 | 4 (1 bit), 8 (2 bits) |
| Proposal 3 | 2 | 2 | 3 |

FIG. 16

|  | No. of sequence simultaneously transmitted ||
|  | HARQ-ACK only / SR only | HARQ-ACK + SR |
| --- | --- | --- |
| Option 1-1 | 2 | 4 |
| Option 1-2 |  | 2 |
| Option 4-1 | 1 | 2 |
| Option 4-2 |  | 1 | ← ADDITIONAL MODE
| Proposal 3 | 2 | 2 |

TERMINAL AND COMMUNICATION METHOD

TECHNICAL FIELD

The present disclosure relates to a terminal and a communication method.

BACKGROUND ART

In recent years, the widespread use of services using mobile broadband has continuously given an exponential increase in data traffic in mobile communication. Accordingly, it is imperative that the data transmission capacity be increased for future use. In addition, the Internet of Things (IoT), in which all "things" are connected via the Internet, is expected to exponentially grow in the future. To support the diversification of services by IoT, in addition to an increase in data transmission capacity, a variety of requirements, such as low latency and a wide communication area (coverage), need to be fulfilled more sophisticatedly. Under these circumstances, the technological development and standardization of the 5th generation mobile communication system (5G) have been in progress, which will significantly improve the performance and functions as compared with the 4th generation mobile communication system (4G).

In 5G standardization, 3GPP (Third Generation Partnership Project) has developed a new radio access technology (NR: New Radio) that does not necessarily have backward compatible with LTE (Long Term Evolution)—Advanced (refer to, for example, PTLs 1 to 3).

In NR, it is planned that a terminal (UE: User Equipment) uses an uplink control channel (PUCCH: Physical Uplink Control Channel) to transmit, to a base station (eNB or gNB), uplink control information (UCI), such as a response signal (ACK/NACK: Acknowledgement/Negative Acknowledgment or HARQ-ACK) that indicates an error detection result of downlink data, downlink channel state information (CSI: Channel State Information), and an uplink radio resource allocation request (SR: Scheduling Request).

In addition, in NR, it is planned that 1- or 2-bit UCI is included in PUCCH and is transmitted.

Furthermore, in NR, "Short PUCCH" and "Long PUCCH" are supported. According to Short PUCCH, PUCCH is transmitted by using one symbol or two symbols in one slot. According to Long PUCCH, PUCCH is transmitted by using three or more symbols in one slot (for example, the minimum number of symbols may be four). Hereinafter, Short PUCCH which transmits PUCCH by using one symbol is referred to as "1-symbol PUCCH."

CITATION LIST

Non Patent Literature

NPL 1: 3GPP TS 36.211 V13.4.0, "Evolved Universal Terrestrial Radio Access (E-UTRA); Physical channels and modulation (Release 13)," December 2016.
NPL 2: 3GPP TS 36.212 V13.4.0, "Evolved Universal Terrestrial Radio Access (E-UTRA); Multiplexing and channel coding (Release 13)," December 2016.
NPL 3: 3GPP TS 36.213 V13.4.0, "Evolved Universal Terrestrial Radio Access (E-UTRA); Physical layer procedures (Release 13)," December 2016.

SUMMARY OF INVENTION

However, a technique for transmitting SR in 1-symbol PUCCH has not been fully examined.

One embodiment of the present disclosure facilitates providing a terminal and a communication method capable of appropriately transmitting SR in 1-symbol PUCCH.

According to an embodiment of the present disclosure, a terminal includes circuitry and a transmitter. The circuitry allocates uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of the terminal. The transmitter transmits the uplink control information.

According to an embodiment of the present disclosure, a terminal includes circuitry and a transmitter. The circuitry allocates uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of the terminal when transmission of the response signal and transmission of the uplink radio resource allocation request signal occur simultaneously. The transmitter transmits the uplink control information.

According to an embodiment of the present disclosure, a terminal includes circuitry and a transmitter. The circuitry allocates uplink control information including at least one of a response signal responsive to downlink data and an uplink radio resource allocation request signal to a resource for an uplink control channel. The transmitter transmits the uplink control channel. A first resource used to transmit the response signal, a second resource used to transmit the radio resource allocation request signal, a third resource used to transmit a reference signal frequency-multiplexed with the uplink control information are allocated to the terminal. The terminal transmits the uplink control information and the reference signal by using one of the first resource and the second resource and the third resource. The first resource and the second resource are allocated to the same resource block.

According to an embodiment of the present disclosure, a communication method includes allocating uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of a terminal and transmitting the uplink control information.

According to an embodiment of the present disclosure, a communication method includes allocating uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of the terminal when transmission of the response signal and transmission of an uplink radio resource allocation request signal occur simultaneously and transmitting the uplink control information.

According to an embodiment of the present disclosure, a communication method includes allocating uplink control information including at least one of a response signal responsive to downlink data and an uplink radio resource allocation request signal to a resource for an uplink control channel, transmitting the uplink control channel, allocating, to a terminal, a first resource used to transmit the response signal, a second resource used to transmit the radio resource allocation request signal, and a third resource used to transmit a reference signal frequency-multiplexed with the uplink control information, and transmitting the uplink control information and the reference signal by using one of the first resource and the second resource and the third resource. The first resource and the second resource are allocated to the same resource block.

It should be noted that these general and specific embodiments may be implemented as a system, a method, an integrated circuit, a computer program, or a recording medium, or any combination of a system, a method, an integrated circuit, a computer program, and a recording medium.

Advantageous Effects of Invention

According to one embodiment of the present disclosure, SR can be properly transmitted on a 1-symbol PUCCH.

Additional benefits and advantages of an embodiment of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 3 illustrates an example of the channel configuration of 1-symbol PUCCH of Option 1-1.

FIG. 4 illustrates an example of the channel configuration of 1-symbol PUCCH of Option 1-2.

FIG. 7 illustrates an example of the number of simultaneously transmitted sequences and the number of sequences allocated per terminal.

FIG. 12 illustrates an example of mode switching relating to the channel configuration of the 1-symbol PUCCH according to the first embodiment.

FIG. 13 illustrates an example of mode switching relating to the channel configuration of the 1-symbol PUCCH according to a second embodiment.

FIG. 16 illustrates an example of mode switching relating to the channel configuration of the 1-symbol PUCCH according to a modification of the third embodiment.

DESCRIPTION OF EMBODIMENTS

Embodiments of the present disclosure are described in detail below with reference to the accompanying drawings.

1-Symbol PUCCH Channel Configuration

According to the 1-symbol PUCCH, the following two channel configurations are examined.

Figure 1:
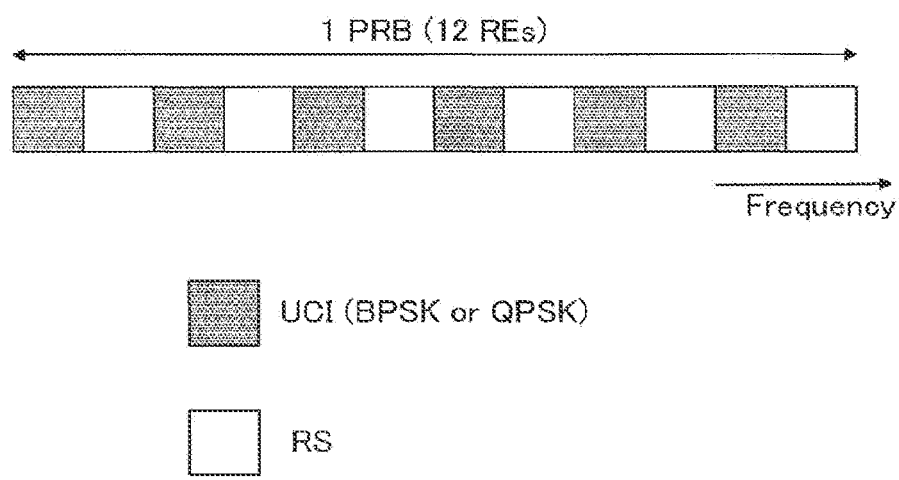
FIG. 1 illustrates an example of the channel configuration of 1-symbol PUCCH of Option 1.

The first channel configuration represents a method for frequency-division multiplexing (FDM) the UCI and a reference signal (RS) (hereinafter, the method is referred to as "Option 1"), as illustrated in FIG. 1. In Option 1, BPSK or QPSK modulation is performed on the basis of 1-bit or 2-bit UCI. The modulated signal (UCI) and the reference signal are mapped onto subcarriers (RE: Resource Element) by FDM.

In Option 1, the resource utilization efficiency does not depend on the number of bits of UCI. For example, in the case where a CAZAC code sequence is used as a sequence for transmitting UCI (hereinafter referred to as a "UCI sequence") and a sequence for transmitting a reference signal (hereinafter referred to as an "RS sequence"), if orthogonal multiplexing among users (UEs) is performed by using cyclic shift, up to 6 UEs can be multiplexed in one PRB (12 REs) in the example illustrated in FIG. 1. However, since Option 1 indicates OFDM (Orthogonal Frequency Division Multiplexing) transmission in which UCI and RS are subjected to FDM, the Peak-to-Average Power Ratio (PAPR) increases.

Figure 2:
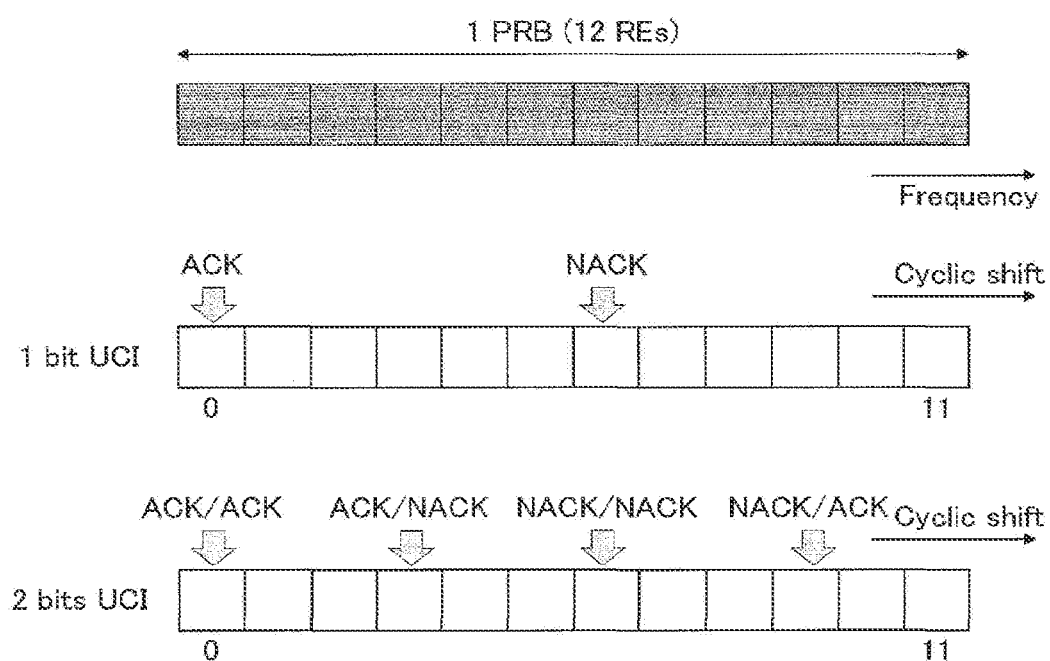
FIG. 2 illustrates an example of the channel configuration of 1-symbol PUCCH of Option 4.

The second channel configuration represents, as illustrated in FIG. 2, a method for selecting a sequence to be transmitted on the basis of 1-bit or 2-bit UCI (a sequence selection) (hereinafter referred to as "Option 4"). In Option 4, as illustrated in FIG. 2, cyclic shift (CS) of a constant amplitude zero auto correlation (CAZAC) code sequence can be used for sequence selection, for example.

In Option 4, the resource utilization efficiency changes according to the number of the number of UCI bits. For example, in the example illustrated in FIG. 2, to transmit 1-bit UCI, it is necessary to allocate 2 sequences per UE. Consequently, in Option 4, up to 6 UEs can be multiplexed into 1 PRB (12 REs). In contrast, to transmit 2-bit UCI, it is necessary to allocate 4 sequences per UE. Consequently, the maximum number of UEs that can be multiplexed into 1 PRB is 3 and, thus, the resource utilization efficiency deteriorates as compared with when 1-bit UCI is transmitted. Note that Option 4 indicates transmission of one sequence, and single carrier transmission can be achieved. As a result, the PAPR can be reduced.

The above-described two channel configurations (Option 1 and Option 4) have been studied for 1-symbol PUCCH for transmitting 1-bit or 2-bit UCI. However, the main target of study of these channel configurations is HARQ-ACK serving as UCI. The two channel configurations have not been studied for transmission of SR.

In addition, in a terminal, transmission of SR and transmission of HARQ-ACK may occur at the same time. In this case, the terminal may stop transmitting (drop) either HARQ-ACK or SR. However, the latency increases. In NR, even though 1-symbol PUCCH is a function employed for the purpose of reducing the latency, there is a possibility that the low latency expected by NR cannot be provided if a dropping process of one of HARQ-ACK and SR is performed. Therefore, simultaneous transmission of SR and HARQ-ACK in NR is a required function, and simultaneous transmission of SR and HARQ-ACK on 1-symbol PUCCH that transmits 1-bit or 2-bit UCI need to be fully examined.

For this reason, according to one embodiment of the present disclosure, a method is described of appropriately performing SR transmission and simultaneous transmission of SR and HARQ-ACK in addition to HARQ-ACK transmission in 1-symbol PUCCH.

Channel Configuration for Transmitting SR and HARQ-ACK in 1-symbol PUCCH

In a 1-symbol PUCCH that transmits 1-bit or 2-bit UCI, if transmission of SR and transmission of HARQ-ACK occur at the same time and, thus, the terminal transmits HARQ-ACK and SR at the same time, the two techniques described below can be applied to each of the Option-1 channel configuration and the Option-4 channel configuration.

The first technique is a technique to simultaneously transmit SR and HARQ-ACK from a terminal using resources allocated for transmission of each of SR and HARQ-ACK if the transmission of SR and the transmission of HARQ-ACK occur simultaneously.

The second method is a technique to simultaneously transmit SR and HARQ-ACK from a terminal transmitting HARQ-ACK by using a resource allocated for transmission of SR if the transmission of SR and the transmission of HARQ-ACK occur simultaneously.

The cases where each of the above-described two methods is applied to each of Option 1 and Option 4 are described in detail below. In the following description, the case where the first method is applied to Option 1 is referred to as "Option 1-1", and the case where the second method is applied to Option 1 is referred to as "Option 1-2". Similarly, the case where the first method is applied to Option 4 is referred to as "Option 4-1", and the case where the second method is applied to Option 4 is referred to as "Option 4-2".

Option 1-1 (FIG. 3)

In Option 1-1, PUCCH resources for the terminal to transmit each of HARQ-ACK and SR are reserved. Hereinafter, the PUCCH resource for HARQ-ACK is referred to as an "HARQ-ACK resource", and the PUCCH resource for SR is referred to as an "SR resource".

If transmission of SR does not occur and transmission of HARQ-ACK occurs, the terminal transmits the HARQ-ACK by using the HARQ-ACK resource. If transmission of SR occurs and transmission of HARQ-ACK does not occur, the terminal transmits SR by using the SR resource. If transmission of SR and transmission of HARQ-ACK occur simultaneously, the terminal transmits SR and HARQ-ACK simultaneously by using both the SR resource and HARQ-ACK resource. At this time, HARQ-ACK is transmitted by using the HARQ-ACK resource, and SR is transmitted by using the SR resource.

FIG. 3 illustrates an example of PUCCH resources (#0 to #23) in the case where in Option 1-1, the PUCCH resource size is set to 1 PRB, CAZAC code sequences are used as a UCI sequence and an RS sequence, and the PUCCH resources are orthogonally multiplexed using cyclic shift.

In FIG. 3, PUCCH resource #0 (PRB #0, Cyclic shift #0) is allocated to the terminal as an SR resource, and the PUCCH resource #12 (PRB #2, Cyclic shift #0) is allocated to the terminal as an HARQ-ACK resource. Therefore, if transmission of SR does not occur and transmission of HARQ-ACK occurs, the terminal transmits HARQ-ACK by using the PUCCH resource #12 (the HARQ-ACK resource). If transmission of SR occurs and transmission of HARQ-ACK does not occur, the terminal transmits SR by using the PUCCH resource #0 (the SR resource). If transmission of SR and transmission of HARQ-ACK occur simultaneously, the terminal transmits SR and HARQ-ACK by using the PUCCH resource #0 (the SR resource) and the PUCCH resource #12 (the HARQ-ACK resource), respectively.

In Option 1-1, the number of PUCCH resources allocated per UE is 2 (for example, PUCCH resources #0 and #12 in FIG. 3). However, if SR has two modes of "with SR" and "without SR", SR can be transmitted by On/Off keying, and two UEs can be multiplexed on the real axis and the imaginary axis of the same PUCCH resource, respectively. In this case, the number of PUCCH resources allocated per UE can be considered to be 1.5.

In addition, in the case of Option 1-1, when SR and HARQ-ACK are simultaneously transmitted, the terminal needs to simultaneously transmit signals by using two PUCCH resources. Accordingly, the PAPR is expected to significantly increase.

Option 1-2 (FIG. 4)

In Option 1-2, as in Option 1-1, an HARQ-ACK resource and an SR resource are reserved for the terminal.

If transmission of SR does not occur and transmission of HARQ-ACK occurs, the terminal transmits HARQ-ACK by using a HARQ-ACK resource. If transmission of SR occurs and transmission of HARQ-ACK does not occur, the terminal transmits SR by using an SR resource. Unlike Option 1-1, if transmission of SR and transmission of HARQ-ACK occur simultaneously, the terminal transmits HARQ-ACK by using an SR resource.

The base station determines by which resource the HARQ-ACK is transmitted by blind detection, such as power determination. If the base station determines that the HARQ-ACK is transmitted by using the SR resource, the base station detects "with SR" and decodes the HARQ-ACK by using the signal on the SR resource. However, if the base station determines that the HARQ-ACK is transmitted by using the HARQ-ACK resource, the base station detects "without SR" and decodes the HARQ-ACK by using the HARQ-ACK resource.

FIG. 4 illustrates an example of PUCCH resources (#0 to #23) in the case where in Option 1-2, the PUCCH resource size is set to 1 PRB, CAZAC code sequences are used as the UCI sequence and the RS sequence, and the PUCCH resources are orthogonally multiplexed by using cyclic shift.

As in FIG. 3, in FIG. 4, PUCCH resource #0 (PRB #0, Cyclic shift #0) is allocated to the terminal as an SR resource, and PUCCH resource #12 (PRB #2, Cyclic shift #0) is allocated to the terminal as an HARQ-ACK resource. If transmission of SR does not occur and transmission of HARQ-ACK occurs, the terminal transmits the HARQ-ACK by using PUCCH resource #12 (the HARQ-ACK resource). If transmission of SR occurs and transmission of HARQ-ACK does not occur, the terminal transmits the SR by using PUCCH resource #0 (the SR resource). If transmission of SR and transmission of HARQ-ACK occur simultaneously, the terminal transmits the HARQ-ACK by using PUCCH resource #0 (the SR resource).

In Option 1-2, the number of PUCCH resources allocated per UE is 2 (for example, PUCCH resources #0 and #12 in FIG. 4).

Figure 5:
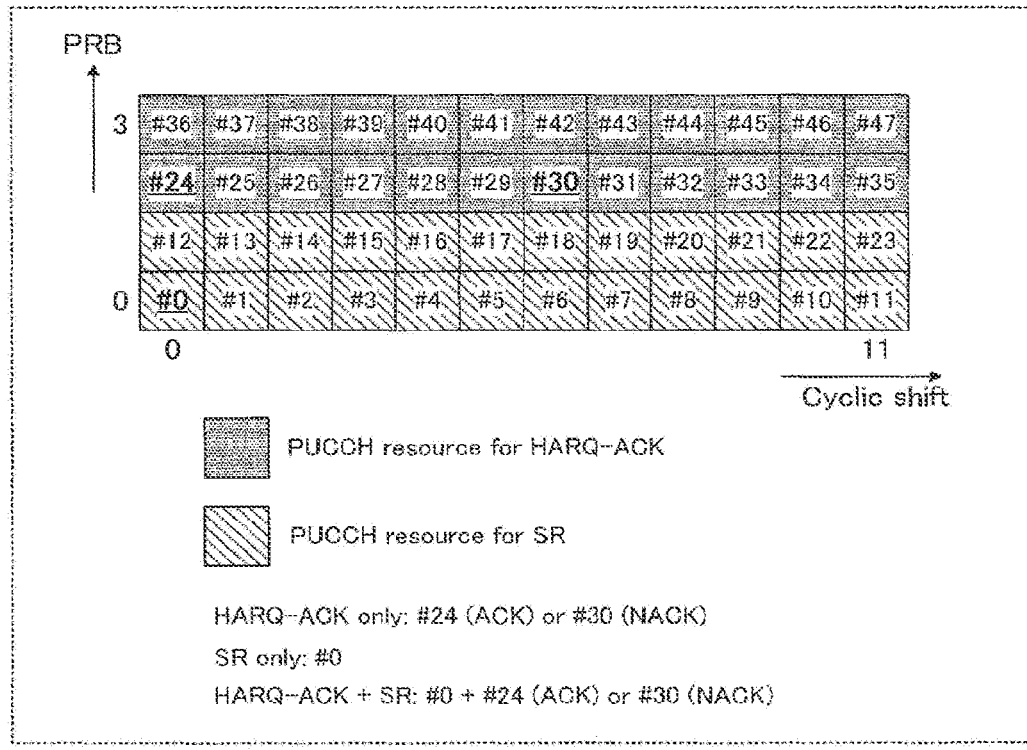
FIG. 5 illustrates an example of the channel configuration of 1-symbol PUCCH of Option 4-1.

Option 4-1 (FIG. 5)

In Option 4-1, in the case of 1-bit UCI, PUCCH resources are reserved for the terminal to transmit ACK, NACK, and SR. Hereinafter, the PUCCH resource for ACK is referred to as an "ACK resource", the PUCCH resource for NACK is referred to as a "NACK resource", and the PUCCH resource for SR is referred to as an "SR resource".

If transmission of SR does not occur and transmission of HARQ-ACK occurs, the terminal transmits the HARQ-ACK (ACK or NACK) by using the ACK resource or NACK resource. If transmission of SR occurs and transmission of HARQ-ACK does not occur, the terminal transmits the SR by using the SR resource. If transmission of SR and transmission of HARQ-ACK occur simultaneously, the terminal simultaneously transmits the HARQ-ACK (ACK or NACK) and the SR by using two PUCCH resources, that is, either the ACK resource or the NACK resource and the SR resource. At this time, the HARQ-ACK is transmitted by using the ACK resource or the NACK resource, and the SR is transmitted by using the SR resource.

The base station determines by which resource the HARQ-ACK (ACK or NACK) is transmitted by blind detection, such as power determination. More specifically, if the base station determines that a signal is transmitted by using an ACK resource, the base station determines that an ACK is transmitted. However, if the base station determines that the signal is transmitted by using an NACK resource, the base station determines that an NACK is transmitted. In addition, the base station performs a determination process on the SR resource by blind detection, such as power determination. If the base station determines that a signal is transmitted by using the SR resource, the base station detects the "with SR".

FIG. 5 illustrates an example of PUCCH resources (#0 to #47) in the case where in Option 4-1, the PUCCH resource size is set to 1 PRB, CAZAC code sequences are used, and the PUCCH resources are orthogonally multiplexed by using cyclic shift.

In FIG. 5, the PUCCH resource #0 (PRB #0, Cyclic shift #0) is allocated to the terminal as the SR resource, the PUCCH resource #24 (PRB #2, Cyclic shift #0) is allocated to the terminal as the ACK resource, and the PUCCH resource #30 (PRB #2, Cyclic shift #6) is allocated to the terminal as the NACK resource. Therefore, if transmission of SR does not occur and transmission of HARQ-ACK occurs, the terminal transmits the HARQ-ACK (ACK or NACK) by using PUCCH resource #24 (an ACK resource) or PUCCH resource #30 (a NACK resource). If transmission of SR occurs and transmission of HARQ-ACK does not occur, the terminal transmits the SR by using PUCCH resource #0 (the SR resource). If transmission of SR and transmission of HARQ-ACK occur simultaneously, the terminal transmits the HARQ-ACK (ACK or NACK) and the SR by using either PUCCH resource #24 or PUCCH #30 and PUCCH resource #0 (an SR Resource).

In addition, in Option 4-1, in the case of 2-bit UCI, PUCCH resources for transmitting ACK/ACK, ACK/NACK, NACK/ACK, NACK/NACK, and SR are reserved for the terminal (not illustrated).

That is, in Option 4-1, the number of PUCCH resources allocated per UE is 3 in the case of 1-bit UCI (for example, PUCCH resources #0, #24, and #30 in FIG. 5) and is 5 in the case of 2-bit UCI.

In addition, in Option 4-1, if SR and HARQ-ACK are simultaneously transmitted, it is expected that the PAPR increases because the terminal needs to simultaneously transmit signals on two PUCCH resources.

Figure 6:
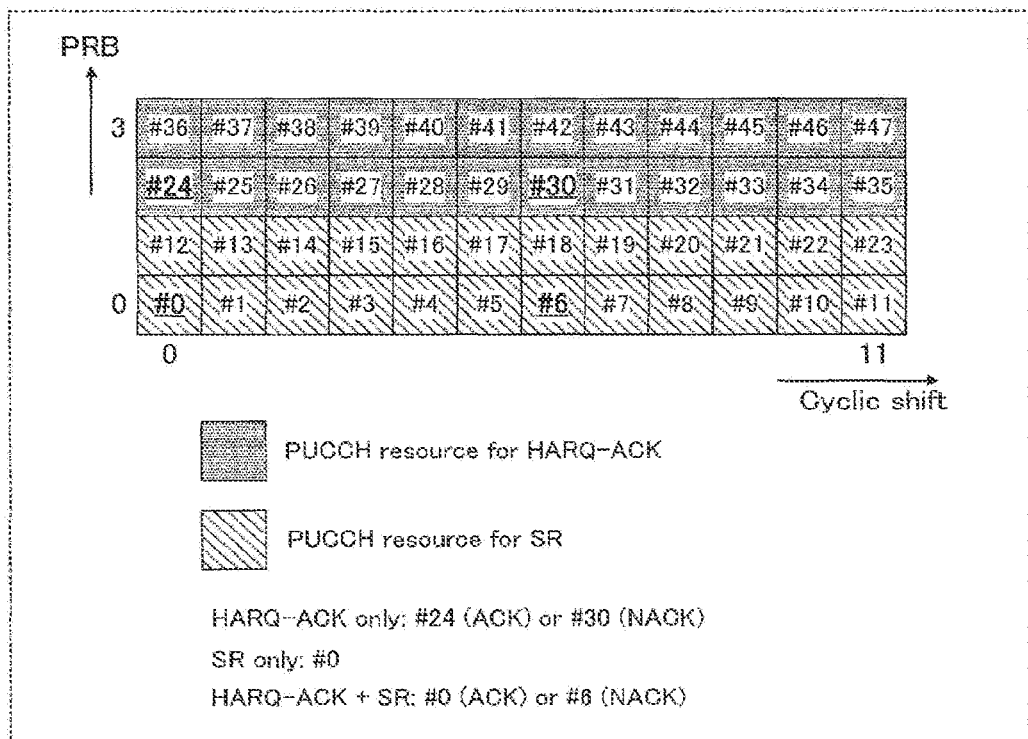
FIG. 6 illustrates an example of the channel configuration of 1-symbol PUCCH of Option 4-2.

Option 4-2 (FIG. 6)

In Option 4-2, in the case of 1-bit UCI, PUCCH resources are reserved for the terminal to transmit ACK without SR, NACK without SR, ACK with SR, and NACK with SR. Hereinafter, the PUCCH resource for ACK without SR is referred to as an "ACK without SR resource", the PUCCH resource for NACK without SR is referred to as a "NACK without SR resource", the PUCCH resource for ACK with SR is referred to as an "ACK with SR resource", and the PUCCH resource for NACK with SR is referred to as a "NACK with SR resource".

If transmission of SR does not occur and transmission of HARQ-ACK occurs, the terminal transmits the HARQ-ACK (ACK or NACK) by using an ACK without SR resource or a NACK without SR resource. If transmission of SR occurs and transmission of HARQ-ACK does not occur, the terminal transmits the SR by using a NACK with SR resource (or an ACK with SR resource). If transmission of SR and transmission of HARQ-ACK occur simultaneously, the terminal transmits the HARQ-ACK by using one of an ACK with SR resource and a NACK with SR resource.

The base station performs a determination process on the ACK without SR resource, the NACK without SR resource, the ACK with SR resource, and the NACK with SR resource by blind detection, such as power determination. More specifically, if the base station determines that a signal is transmitted by using the ACK without SR resource, the base station determines that the signal is ACK and further detects the "without SR". If the base station determines that a signal is transmitted by using the NACK without SR resource, the base station determines that the signal is NACK and further detects the "without SR". If the base station determines that a signal is transmitted by using the ACK with SR resource, the base station determines that the signal is ACK and further detects the "with SR". If the base station determines that a signal is transmitted by using the NACK with SR resource, the base station determines that the signal is NACK and further detects the "with SR".

FIG. 6 illustrates an example of PUCCH resources (#0 to #47) in the case where in Option 4-2, the PUCCH resource size is set to 1 PRB, CAZAC code sequences are used, and the PUCCH resources are orthogonally multiplexed by using cyclic shift.

In FIG. 6, PUCCH resource #0 (PRB #0, Cyclic shift #0) is allocated to the terminal as an ACK with SR resource, PUCCH resource #6 (PRB #0, Cyclic shift #6) is allocated to the terminal as a NACK with SR resource, PUCCH resource #24 (PRB #2, Cyclic shift #0) is allocated to the terminal as an ACK without SR resource, and PUCCH resource #30 (PRB #2, Cyclic shift #6) is allocated to the terminal as an NACK without SR resource.

That is, in FIG. 6, if transmission of SR does not occur and transmission of HARQ-ACK occurs, the terminal transmits the HARQ-ACK (ACK or NACK) by using PUCCH resource #24 (an ACK without SR resource) or PUCCH resource #30 (a NACK without SR resource). If transmission of SR occurs and transmission of HARQ-ACK does not occur, the terminal transmits the SR by using PUCCH resource #6 (a NACK with SR resource) (or PUCCH resource #0). If transmission of SR and transmission of HARQ-ACK simultaneously occur, the terminal transmits the HARQ-ACK (ACK or NACK) by using PUCCH resource #0 (an ACK with SR resource) or PUCCH resource #6 (a NACK with SR resource).

In addition, in Option 4-2, in the case of 2-bit UCI, the PUCCH resources are reserved for the terminal to transmit ACK/ACK without SR, ACK/NACK without SR, NACK/ACK without SR, and NACK/NACK without SR, and ACK/ACK with SR, ACK/NACK with SR, NACK/ACK with SR, and NACK/NACK with SR (not illustrated).

That is, in Option 4-2, the number of PUCCH resources allocated per UE is 4 in the case of 1-bit UCI (PUCCH resources #0, #6, #24, and #30 in FIG. 6) and is 8 in the case of 2-bit UCI.

In addition, in Option 4-2, when SR and HARQ-ACK are simultaneously transmitted, the PAPR does not increase because the SR and HARQ-ACK are transmitted by using a single PUCCH resource.

Option 1-1, Option 1-2, Option 4-1, and Option 4-2 have been described above.

Noise Power Limited Environment and Interference Power Limited Environment

In general, a cellular system is expected to operate in two scenarios: a "noise power limited environment" and an "interference power limited environment".

In a noise power limited environment represented by a cell edge or the like, transmission power is strictly limited. Accordingly, a transmission method that increases the PAPR needs to be avoided.

In contrast, the interference power limited environment is a scenario in which the resource utilization efficiency has a priority to the transmission power limitation.

Relationship between PAPR and Resource Utilization Efficiency

In Option 1 (including Option 1-1 and Option 1-2) described above, a CAZAC code sequence is used as each of a UCI sequence and an RS sequence, and the UCI sequence is BPSK or QPSK modulated by UCI. Accordingly, it can be considered that two sequences are allocated to one PUCCH resource. That is, in terms of sequence selection and sequence transmission, Option 1 and Option 4 can be considered in a unified manner.

When considering Option 1 and Option 4 in a unified manner in terms of sequence selection and sequence transmission, the number of transmission sequences and the number of allocated sequences per UE in the above-described Option 1-1, Option 1-2, Option 4-1, and Option 4-2 are summarized as illustrated in FIG. 7.

As described above, in Option 1-1, an HARQ-ACK resource and an SR resource are reserved. At this time, two sequences, that is, a UCI sequence and an RS sequence are included in each of the HARQ-ACK resource and the SR resource. Thus, in Option 1-1, the required number of sequences per UE is 4 (refer to FIG. 7). However, if the SR has two states "with SR" and "without SR", the SR can be transmitted by using On/Off keying. At this time, one of the two UEs is allocated to the real axis of the SR sequence, the other is allocated to the imaginary axis of the same SR sequence, and the UEs can be multiplexed. In this case, in Option 1-1, the required number of sequences allocated per UE can be regarded as 3.5 (refer to FIG. 7).

In addition, in Option 1-1, if transmission of SR does not occur and transmission of HARQ-ACK occurs (HARQ-ACK only), the terminal transmits the HARQ-ACK by using the HARQ-ACK resource, so that two sequences, that is, the UCI sequence and the RS sequence are transmitted simultaneously (refer to FIG. 7). If transmission of SR occurs and transmission of HARQ-ACK does not occur (SR only), the terminal transmits the SR by using the SR resource, so that two sequences, that is, the SR sequence and the RS sequence are transmitted simultaneously (refer to FIG. 7). If the transmission of SR and the transmission of HARQ-ACK occur simultaneously (HARQ+SR), the terminal transmits the HARQ-ACK and the SR by using the HARQ-ACK resource and the SR resource, respectively, so that a total of four sequences, that is, the UCI sequence, the RS sequence for HARQ-ACK, the SR sequence, and the RS sequence for SR, are transmitted simultaneously (refer to FIG. 7).

In Option 1-2, an HARQ-ACK resource and an SR resource are reserved. At this time, two sequences, that is, a UCI sequence and an RS sequence are included in each of the HARQ-ACK resource and the SR resource. Therefore, in Option 1-2, the required number of sequences per UE is 4 (refer to FIG. 7).

In addition, in Option 1-2, if transmission of SR does not occur and transmission of HARQ-ACK occurs, the terminal transmits the HARQ-ACK by using the HARQ-ACK resource, so that two sequences, that is, a UCI sequence and an RS sequence are transmitted simultaneously (refer to FIG. 7). If transmission of SR occurs and transmission of HARQ-ACK does not occur, the terminal transmits the SR by using the SR resource, so that two sequences, that is, the SR sequence and the RS sequence are simultaneously transmitted (refer to FIG. 7). If transmission of SR and transmission of HARQ-ACK occur simultaneously, the terminal transmits the HARQ-ACK by using the SR resource, so that two sequences, that is, the UCI sequence and the RS sequence are simultaneously transmitted (refer to FIG. 7).

In Option 4-1, in the case of 1-bit UCI, an ACK resource, a NACK resource, and an SR resource are reserved. In addition, in the case of 2-bit UCI, PUCCH resources for transmitting ACK/ACK, ACK/NACK, NACK/ACK, NACK/NACK, and SR are reserved. At this time, each of the resources includes one sequence. Therefore, in Option 4-1, in the case of 1-bit UCI, the required number of sequences allocated per UE is 3. In the case of 2-bit UCI, the required number of sequences allocated per UE is 5 (refer to FIG. 7).

In addition, in Option 4-1, if transmission of SR does not occur and transmission of HARQ-ACK occurs, the terminal transmits the HARQ-ACK by using an ACK resource or a NACK resource, so that one sequence is transmitted (refer to FIG. 7). If transmission of SR occurs and transmission of HARQ-ACK does not occur, the terminal transmits the SR by using the SR resource, so that one sequence is transmitted (refer to FIG. 7). If the transmission of SR and transmission of HARQ-ACK occur simultaneously, the terminal simultaneously transmits the HARQ-ACK and the SR by using two PUCCH resources, that is, one of the ACK resource and the NACK resource and the SR resource, so that two sequences, that is, one of an ACK sequence and a NACK sequence and an SR sequence are transmitted (refer to FIG. 7).

In Option 4-2, in the case of 1-bit UCI, an ACK without SR resource, a NACK without SR resource, an ACK with SR resource, and a NACK with SR resource are reserved. In addition, in the case of a 2-bit UCI, PUCCH resources are reserved for the terminal to transmit ACK/ACK without SR, ACK/NACK without SR, NACK/ACK without SR, and NACK/NACK without SR, and ACK/ACK with SR, ACK/NACK with SR, NACK/ACK with SR, and NACK/NACK with SR. Therefore, in Option 4-2, the required number of sequences allocated per UE is 4 in the case of 1-bit UCI, and the required number of sequences allocated per UE is 8 in the case of 2-bit UCI (refer to FIG. 7).

In addition, in Option 4-2, if transmission of SR does not occur and transmission of HARQ-ACK occurs, the terminal transmits the HARQ-ACK by using an ACK without SR resource or a NACK without SR resource, so that one sequence is transmitted (refer to FIG. 7). If transmission of SR occurs and transmission of HARQ-ACK does not occur, the terminal transmits the SR by using a NACK with SR resource (or an ACK with SR resource), so that one sequence is transmitted (refer to FIG. 7). If transmission of SR and transmission of HARQ-ACK occur simultaneously, the terminal transmits the HARQ-ACK by using one of an ACK with SR resource and a NACK with SR resource, so that one sequence is transmitted (refer to FIG. 7).

As can be seen from FIG. 7, comparison of Option 1-1, Option 1-2, Option 4-1, and Option 4-2 indicates that the PAPR increases as the number of simultaneously transmitted sequences increases. In addition, in terms of the resource utilization efficiency (the required number of sequences allocated per UE), the resource utilization efficiency improves as the number of simultaneously transmitted sequences increases. For example, Option 1-1 has a higher resource utilization efficiency but has a higher PAPR, as compared with other Options. In contrast, Option 4-2 has a lower PAPR but has a lower resource utilization efficiency, as compared with other Options.

As described above, from the viewpoint of the number of simultaneously transmitted sequences, there is a trade-off between the PAPR and the resource utilization efficiency.

According to one embodiment of the present disclosure, the channel configuration of 1-symbol PUCCH is set in consideration of the feature (the PAPR or the resource utilization efficiency) to be prioritized in the above-described scenario (the noise power limited environment or the interference power limited environment) of the cellular system and the trade-off relationship between the PAPR and the resource utilization efficiency as illustrated in FIG. 7.

Each of the embodiments is described in detail below.

First Embodiment

Overview of Communication System

A communication system according to each of the embodiments of the present disclosure includes a base station 100 and a terminal 200.

Figure 8:
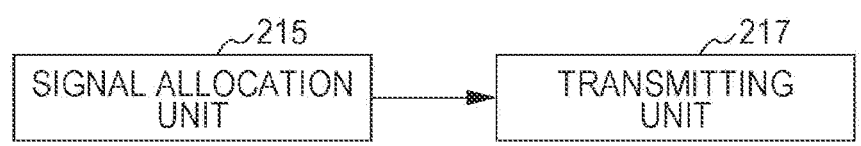
FIG. 8 illustrates the configuration of part of a terminal according to a first embodiment.

FIG. 8 is a block diagram illustrating a configuration of part of the terminal 200 according to each of the embodiments of the present disclosure. In the terminal 200 illustrated in FIG. 8, a signal allocation unit 215 allocates, to a resource for an uplink control channel (a PUCCH resource), uplink control information (UCI) including at least one of an acknowledgment signal (an HARQ-ACK) responsive to downlink data and an uplink radio resource allocation request signal (an SR) on the basis of, among a plurality of modes (Options) relating to the channel configuration of an uplink control channel (1-symbol PUCCH), the one selected in accordance with the operating environment of the terminal 200. A transmitting unit 217 transmits the uplink control information.

Configuration of Base Station

Figure 9:
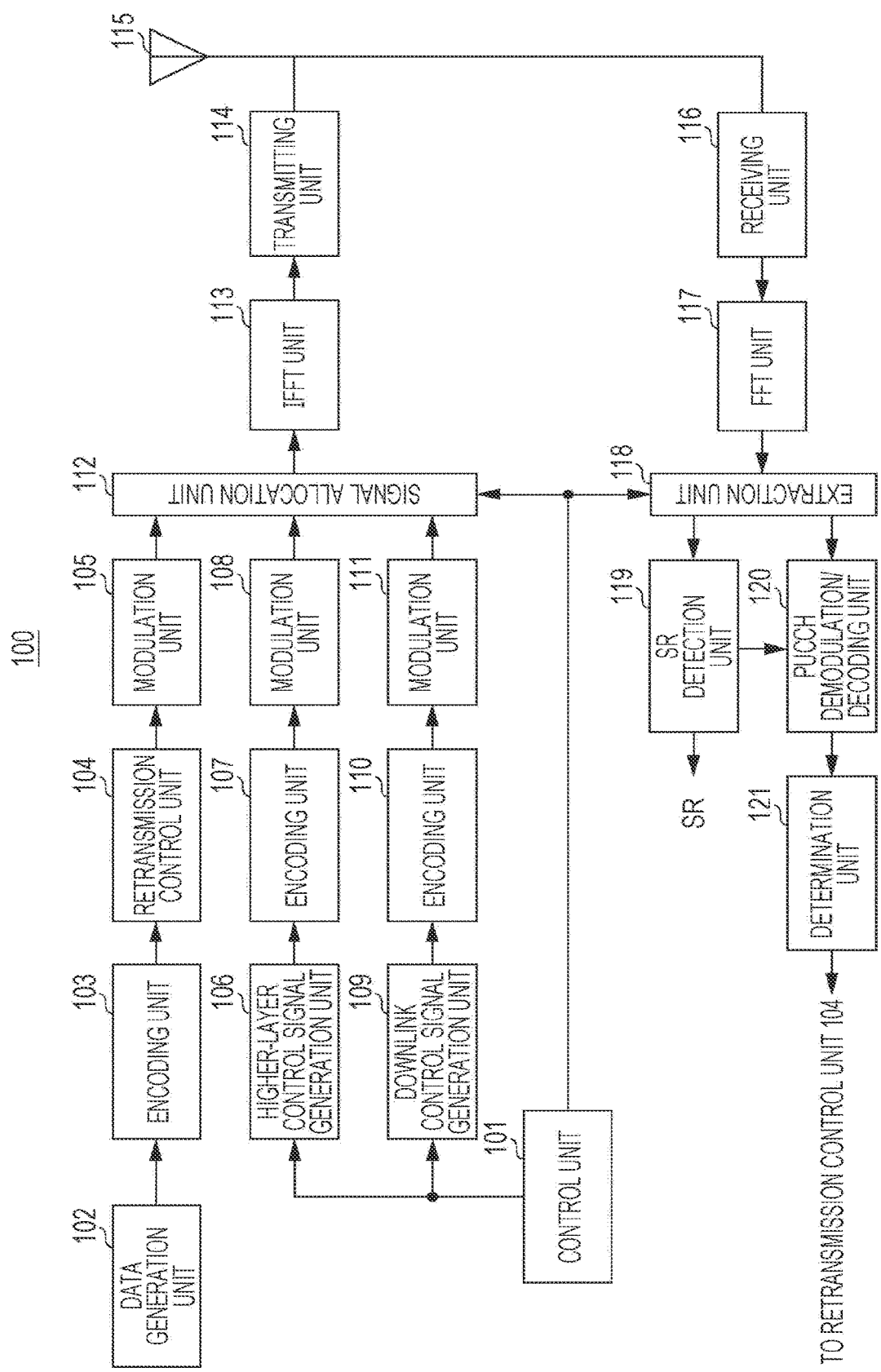
FIG. 9 illustrates the configuration of a base station according to the first embodiment.

FIG. 9 is a block diagram illustrating the configuration of the base station 100 according to the first embodiment of the present disclosure. In FIG. 9, the base station 100 includes a control unit 101, a data generation unit 102, an encoding unit 103, a retransmission control unit 104, a modulation unit 105, a higher-layer control signal generation unit 106, and an encoding unit 107, a modulation unit 108, a downlink control signal generation unit 109, an encoding unit 110, a modulation unit 111, a signal allocation unit 112, an IFFT (Inverse Fast Fourier Transform) unit 113, a transmitting unit 114, an antenna 115, a receiving unit 116, an FFT (Fast Fourier Transform) unit 117, an extraction unit 118, an SR detection unit 119, a PUCCH demodulation/decoding unit 120, and a determination unit 121.

The control unit 101 determines allocation of a radio resource to a downlink signal (for example, PDSCH: Physical Downlink Shared Channel) and outputs, to the downlink control signal generation unit 109 and the signal allocation unit 112, downlink resource allocation information that instructs resource allocation for a downlink signal.

In addition, the control unit 101 determines allocation of a PUCCH resource (for example, the time, the frequency, or the sequence) for transmitting an HARQ-ACK signal to the downlink signal and outputs, to the downlink control signal generation unit 109 and the extraction unit 118, PUCCH resource allocation information for instructing PUCCH resource allocation to the HARQ-ACK.

Furthermore, the control unit 101 determines allocation of a PUCCH resource (for example, the time (sometimes including the period), the frequency, or the sequence) for transmission of SR and outputs, to the higher-layer control signal generation unit 106 and the extraction unit 118, PUCCH resource allocation information for instructing PUCCH resource allocation to SR.

At this time, when using the above-described PUCCH channel configuration, the control unit 101 selects a PUCCH resource (a sequence) for transmitting RS, a PUCCH resource (a sequence) for transmitting an HARQ-ACK signal, or a PUCCH resource (a sequence) for transmitting an SR and outputs the determined PUCCH resource information to the higher-layer control signal generation unit 106 or the downlink control signal generation unit 109.

In addition, the control unit 101 determines information about a mode relating to the PUCCH channel configuration (for example, Option 1-1, 1-2, 4-1, or 4-2) and outputs the determined PUCCH mode information to the higher-layer control signal generation unit 106 or the downlink control signal generation unit 109. Note that if the information relating to the PUCCH mode is not explicitly sent to the terminal 200, the determined PUCCH mode information is not output to the higher-layer control signal generation unit 106 or the downlink control signal generation unit 109.

The data generation unit 102 generates downlink data for the terminal 200 and outputs the downlink data to the encoding unit 103.

The encoding unit 103 performs error correction coding on the downlink data input from the data generation unit 102 and outputs the coded data signal to the retransmission control unit 104.

At the time of initial transmission, the retransmission control unit 104 stores the encoded data signal input from the encoding unit 103 and outputs the data signal to the modulation unit 105. In addition, upon receiving, from the determination unit 121 (described below), a NACK responsive to the transmitted data signal, the retransmission control unit 104 outputs corresponding stored data to the modulation unit 105. However, upon receiving, from the determination unit 121, an ACK responsive to the transmitted data signal, the retransmission control unit 104 deletes the corresponding stored data.

The modulation unit 105 modulates the data signal input from the retransmission control unit 104 and outputs the data modulated signal to the signal allocation unit 112.

The higher-layer control signal generation unit 106 generates a control information bit sequence by using the control information (for example, the PUCCH resource allocation information or the PUCCH mode information) input from the control unit 101 and outputs the generated control information bit sequence to the encoding unit 107.

The encoding unit 107 performs error correction coding on the control information bit sequence input from the higher-layer control signal generation unit 106 and outputs the coded control signal to the modulation unit 108.

The modulation unit 108 modulates the control signal input from the encoding unit 107 and outputs the modulated control signal to the signal allocation unit 112.

The downlink control signal generation unit 109 generates a downlink control information bit sequence by using the control information (for example, the downlink resource allocation information, the PUCCH resource allocation information, or the PUCCH mode information) input from the control unit 101 and outputs the generated control information bit sequence to the encoding unit 110. Note that the control information may be transmitted to a plurality of terminals. Accordingly, for each of the terminals, the downlink control signal generation unit 109 may set the terminal ID of the terminal in the control information destined for the terminal and generates the bit sequence.

The encoding unit 110 performs error correction coding on the control information bit sequence input from the downlink control signal generation unit 109 and outputs the coded control signal to the modulation unit 111.

The modulation unit 111 modulates the control signal input from the encoding unit 110 and outputs the modulated control signal to the signal allocation unit 112.

The signal allocation unit 112 maps the data signal input from the modulation unit 105 to a radio resource indicated by the downlink resource allocation information input from the control unit 101. In addition, the signal allocation unit 112 maps the control signal input from the modulation unit 108 or the modulation unit 111 to a radio resource. The signal allocation unit 112 outputs, to the IFFT unit 113, the mapped downlink signal.

The IFFT unit 113 performs a transmission waveform generation process, such as OFDM, on the signal input from the signal allocation unit 112. In the case of OFDM transmission in which a CP (Cyclic Prefix) is added, the IFFT unit 113 adds a CP (not illustrated). The IFFT unit 113 outputs the generated transmission waveform to the transmitting unit 114.

The transmitting unit 114 performs an RF (Radio Frequency) process, such as D/A (Digital-to-Analog) conversion and up-conversion, on the signal input from the IFFT unit 113 and transmits the signal to the terminal 200 via the antenna 115.

The receiving unit 116 performs an RF process, such as down conversion and A/D (Analog-to-Digital) conversion, on the uplink signal waveform received from the terminal 200 via antenna 115 and outputs, to the FFT unit 117, the uplink signal waveform subjected to the reception process.

The FFT unit 117 performs an FFT process on the uplink signal waveform input from the receiving unit 116. The FFT process converts a time domain signal into a frequency domain signal. The FFT unit 117 outputs, to the extraction unit 118, a frequency domain signal obtained through the FFT process.

The extraction unit 118 extracts, from the signal input from the FFT unit 117, the radio resource part of the PUCCH for SR or HARQ-ACK on the basis of the information received from the control unit 101 (for example, the PUCCH resource allocation information) and outputs the extracted component of the radio resource to the SR detection unit 119 and the PUCCH demodulation/decoding unit 120.

The SR detection unit 119 performs power detection on the signal input from the extraction unit 118 and detects the presence or absence of SR. In addition, if the SR detection unit 119 detects that SR is present and HARQ-ACK is transmitted by using an SR resource, the SR detection unit 119 outputs, to the PUCCH demodulation/decoding unit 120, the signal input from the extraction unit 118.

The PUCCH demodulation/decoding unit 120 performs equalization, demodulation, decoding, or power detection on the PUCCH signal input from the extraction unit 118 or the SR detection unit 119 and outputs, to the determination unit 121, the decoded bit sequence or the signal subjected to power detection.

The determination unit 121 determines whether the HARQ-ACK signal transmitted from the terminal 200 is an ACK or a NACK responsive to the transmitted data signal on the basis of the bit sequence input from the PUCCH demodulation/decoding unit 120 or the signal subjected to power detection. The determination unit 121 outputs the result of determination to the retransmission control unit 104.

Configuration of Terminal

Figure 10:
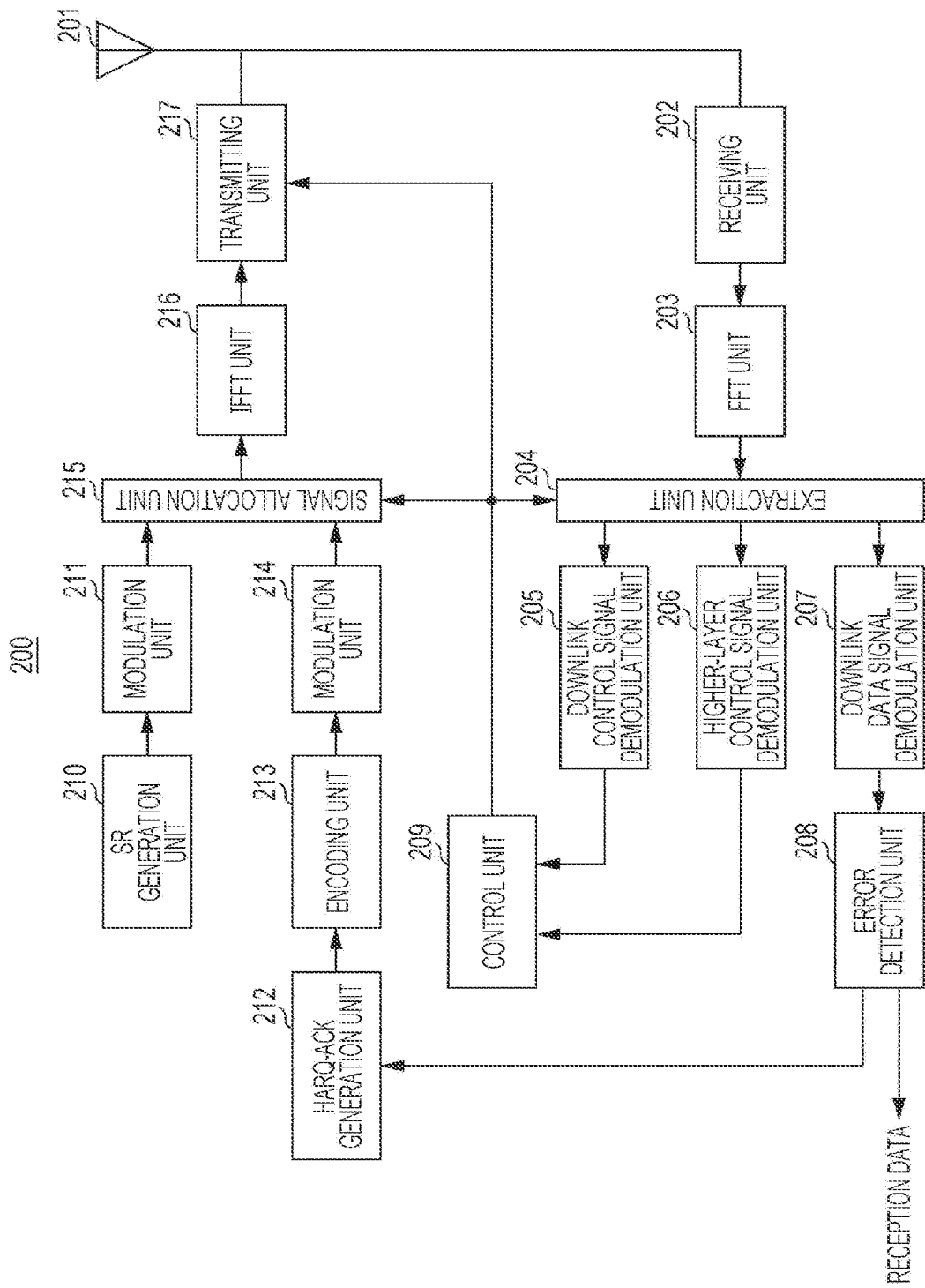
FIG. 10 illustrates the configuration of a terminal according to the first embodiment.

FIG. 10 is a block diagram illustrating the configuration of the terminal 200 according to the first embodiment of the present disclosure. In FIG. 10, the terminal 200 includes an antenna 201, a receiving unit 202, an FFT unit 203, an extraction unit 204, a downlink control signal demodulation unit 205, a higher-layer control signal demodulation unit 206, a downlink data signal demodulation unit 207, an error detection unit 208, a control unit 209, an SR generation unit 210, a modulation unit 211, an HARQ-ACK generation unit 212, an encoding unit 213, a modulation unit 214, a signal allocation unit 215, an IFFT unit 216, and the transmitting unit 217.

The receiving unit 202 performs an RF process, such as down-conversion and A/D (Analog-to-Digital) conversion, on the signal waveform of the downlink signals (the data signal and the control signal) received from the base station 100 via the antenna 201 and outputs the obtained reception signal (a baseband signal) to the FFT unit 203.

The FFT unit 203 performs an FFT process on the signal (a time domain signal) input from the receiving unit 202. In the FFT process, a time domain signal is converted into a frequency domain signal. The FFT unit 203 outputs, to the extraction unit 204, the frequency domain signal obtained through the FFT process.

The extraction unit 204 extracts the downlink control signal from the signal input from the FFT unit 203 on the basis of the control information input from the control unit 209 and outputs the downlink control signal to the downlink control signal demodulation unit 205. In addition, the extraction unit 204 extracts the higher-layer control signal and the downlink data signal on the basis of the control information input from the control unit 209, outputs the higher-layer control signal to the higher-layer control signal demodulation unit 206, and outputs the downlink data signal to the downlink data signal demodulation unit 207.

The downlink control signal demodulation unit 205 performs blind decoding on the downlink control signal input from the extraction unit 204. If the downlink control signal demodulation unit 205 determines that the downlink control signal is a signal destined for itself, the downlink control signal demodulation unit 205 demodulates the control signal and outputs the control signal to the control unit 209.

The higher-layer control signal demodulation unit 206 demodulates the higher-layer control signal input from the extraction unit 204 and outputs the demodulated higher-layer control signal to the control unit 209.

The downlink data signal demodulation unit 207 demodulates and decodes the downlink data signal input from the extraction unit 204 and outputs the decoded downlink data to the error detection unit 208.

The error detection unit 208 performs error detection on the downlink data input from the downlink data signal demodulation unit 207 and outputs the result of error detection to the HARQ-ACK generation unit 212. In addition, the error detection unit 208 outputs, as reception data, the downlink data determined to have no error as a result of error detection.

The control unit 209 calculates radio resource allocation for the downlink data signal on the basis of the downlink resource allocation information indicated by the control signal input from the downlink control signal demodulation unit 205 and outputs, to the extraction unit 204, information regarding the calculated radio resource allocation.

In addition, the control unit 209 calculates a PUCCH resource (an SR resource) used to transmit an SR and a PUCCH resource (an HARQ-ACK resource) used to transmit an HARQ-ACK on the basis of the PUCCH resource allocation information related to PUCCH resource allocation for SR and HARQ-ACK by using the higher-layer control signal input from the higher-layer control signal demodulation unit 206 and the control signal input from the downlink control signal demodulation unit 205. Thereafter, the control unit 209 outputs the calculated information regarding the PUCCH resources to the signal allocation unit 215.

Furthermore, by using a method described below, the control unit 209 determines the mode, the time/frequency resources, and the sequence for a PUCCH by which the terminal 200 actually transmits SR and HARQ-ACK. Thereafter, the control unit 209 outputs the determined information to the signal allocation unit 215 and the transmitting unit 217.

When the terminal 200 requests the base station 100 to allocate a radio resource to uplink transmission, the SR generation unit 210 generates an SR and outputs the generated SR signal to the modulation unit 211.

The modulation unit 211 modulates the SR signal input from the SR generation unit 210 and outputs the modulated SR signal to the signal allocation unit 215. Note that the modulation part 211 need not perform a modulation process if only one sequence is transmitted.

The HARQ-ACK generation unit 212 generates an HARQ-ACK signal (an ACK or a NACK) responsive to the received downlink data on the basis of the result of error detection input from the error detection unit 208. The HARQ-ACK generation unit 212 outputs the generated HARQ-ACK signal (a bit sequence) to the encoding unit 213.

The encoding unit 213 performs error correction coding on the bit sequence input from the HARQ-ACK generation unit 212 and outputs the coded bit sequence (the HARQ-ACK signal) to the modulation unit 214.

The modulation unit 214 modulates the HARQ-ACK signal input from the encoding unit 213 and outputs the modulated HARQ-ACK signal to the signal allocation unit 215. Note that the modulation unit 214 need not perform the modulation process if only one sequence is transmitted.

The signal allocation unit 215 maps the SR signal input from the modulation unit 211 or the HARQ-ACK signal input from the modulation unit 214 to the radio resource indicated by the control unit 209. The signal allocation unit 215 outputs, to the IFFT unit 216, the uplink signal (for example, uplink control information (UCI)) having the signal mapped thereto.

The IFFT unit 216 performs a transmission waveform generation process, such as OFDM, on the signal input from the signal allocation unit 215. In the case of OFDM transmission in which a CP (Cyclic Prefix) is added, the IFFT unit 216 adds a CP (not illustrated). Alternatively, if the IFFT unit 216 generates a single carrier waveform, a DFT (Discrete Fourier Transform) unit may be added upstream of the signal allocation unit 215 (not illustrated). The IFFT unit 216 outputs the generated transmission waveform to the transmitting unit 217.

The transmitting unit 217 performs an RF (Radio Frequency) process, such as transmission power control, digital-to-analog (D/A) conversion, and up-conversion, on the signal input from the IFFT unit 216 on the basis of the information input from the control unit 209 and transmits a radio signal to the base station 100 via the antenna 201.

Operations Performed by Base Station 100 and Terminal 200

The operations performed by the base station 100 and the terminal 200 having the above-described configuration are described in detail below.

Figure 11:
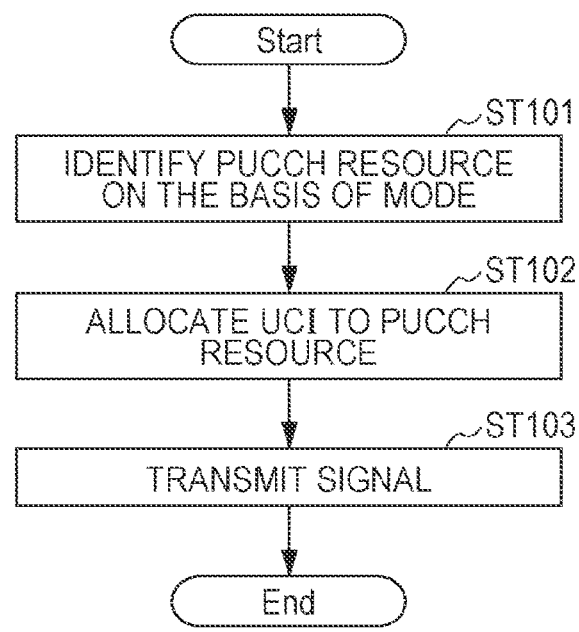
FIG. 11 illustrates processing performed by a terminal according to the first embodiment.

FIG. 11 illustrates a flow of a process performed by the terminal 200 according to the present embodiment.

According to the present embodiment, the terminal 200 identifies the PUCCH resource for transmitting the uplink control information (UCI) on the basis of, among the plurality of modes (Options) relating to the channel configuration of 1-symbol PUCCH for transmitting 1 or 2-bit UCI, the one selected in accordance with the operating environment of the terminal 200 (ST101).

Hereinafter, the case is described where the terminal 200 can set two modes as the plurality of modes (Options) relating to the channel configuration of 1-symbol PUCCH. For example, as illustrated in FIG. 12, the terminal 200 may be allowed to set Option 1-1 and Option 4-2, which are examples of the two modes. As described above, Option 4-2 is a mode in which the PAPR is lower than that of Option 1-1. In contrast, Option 1-1 is a mode in which the utilization efficiency of PUCCH resources is higher than that of Option 4-2.

In this case, for example, the base station 100 selects one of the plurality of modes (Option 1-1 and Option 4-2) relating to the channel configuration of 1-symbol PUCCH in accordance with the operating environment of the terminal 200. For example, if it is expected that the terminal 200 is in an interference power limited environment (for example, the terminal is located near the cell center), Option 1-1, which has the best resource utilization efficiency (that is, is suitable for the interference power limited environment), is selected. In contrast, if it is expected that the terminal 200 is in a noise power limited environment (for example, the terminal 200 is located near the cell edge), Option 4-2, which can most reduce the PAPR (that is, is suitable for the noise power limited environment), is selected.

Note that the determination as to whether the terminal 200 is in an interference power limited environment or in a noise power limited environment may be made by the base station on the basis of, for example, the parameters (the reception quality and the reception power) reported by the terminal 200. In addition, as described above, the mode used by the terminal 200 may be selected by the base station 100 or may be selected by the terminal 200.

The terminal 200 allocates UCI including at least one of HARQ-ACK and SR for downlink data to a PUCCH resource allocated to the terminal 200 on the basis of the mode of the channel configuration set to the terminal 200 (ST102). That is, when the terminal 200 is in an interference limited environment, the terminal 200 allocates UCI (including at least one of HARQ-ACK and SR) to the PUCCH resource on the basis of Option 1-1 (for example, refer to FIG. 3). In contrast, when the operating environment of the terminal 200 is a noise power limited environment, the terminal 200 allocates UCI to the PUCCH resource on the basis of Option 4-2 (for example, refer to FIG. 6).

Thereafter, the terminal 200 transmits the UCI by using 1-symbol PUCCH (ST103).

By setting the mode in accordance with the operating environment of the terminal 200 in the cell in this manner, the terminal 200 can set the PUCCH channel configuration suitable for the operating environment of the terminal. As a result, the transmission power efficiency of the terminal 200 or the resource utilization efficiency of the network can be improved.

Method for Determining Terminal Mode

Method 1 to method 4 are described below as an example of methods for determining which of the two modes the terminal 200 employs.

Method 1

The mode may be informed to the terminal 200 by signaling from the base station 100 (for example, a higher-layer indication specific to the group, dynamic signaling specific to the group (Group common PDCCH), or a higher-layer indication specific to the terminal or dynamic signaling specific to the terminal (DCI: Downlink Control Information)). The terminal 200 identifies which one of the two modes to employ for the operation on the basis of the information regarding the mode informed from the base station 100.

Method 2

Alternatively, the terminal 200 may determine which one of the two modes to employ without relying on explicit signaling from the base station 100. For example, when two modes, that is, Option 1-1 and Option 4-2, are settable, the terminal 200 determines the mode in accordance with the presence or absence of RS to be transmitted. This is because for example, as illustrated in FIG. 1 and FIG. 2, according to 1-symbol PUCCH transmission, transmission of RS occurs in Option 1-1 (Option 1), whereas transmission of RS does not occur in Option 4-2 (Option 4). That is, the terminal 200 operates on the basis of Option 1-1 if there is an RS. However, the terminal 200 operates on the basis of Option 4-2 if there is no RS.

Method 3

In addition, when multiple random access channel (RACH) resources are set, the terminal 200 may determine which one of the two modes to employ on the basis of the RACH resources. The base station 100 informs the terminal 200 of the plurality of RACH resources by cell-specific or group-specific higher-layer indication.

In this case, each of the RACH resources is linked to RSRP (Reference Signal Received Power)/RSRQ (Reference Signal Received Quality) measured by the terminal 200. In addition, the two modes settable by the terminal 200 are associated with the RACH resources. That is, the two modes settable by the terminal 200 are further associated with the RSRP/RSRQ linked to the RACH resources.

Therefore, the terminal 200 measures its own RSRP/RSRQ, selects the RACH resource corresponding to the measured RSRP/RSRQ, and determines the mode relating to the 1-symbol PUCCH channel configuration used to transmit 1-bit or 2-bit UCI that the terminal 200 uses on the basis of the selected RACH resource.

Method 4

NR supports an operation with multiple subcarrier spacing (for example, 15 kHz, 30 kHz, and 60 kHz). If, for example, two modes, Option 1-1 and Option 4-2, are settable, the terminal 200 may determine the mode according to the subcarrier spacing at the time of PUCCH transmission.

If, for example, two modes, Option 1-1 and Option 4-2, are settable, the terminal 200 may set Option 1-1 for a 15-kHz subcarrier spacing and set Option 4-2 for a 30-kHz or 60-kHz subcarrier spacing. This is because as the subcarrier spacing increases, the symbol length decreases and, thus, the coverage decreases. Therefore, if the subcarrier spacing is large, a mode having a smaller PAPR and providing a wider coverage (Option 4-2 in this case) is to be set.

Like the above-described methods 2 to 4, the methods for determining a mode not relying on explicit signaling have an advantage of reducing the overhead of signaling.

As described above, according to the present embodiment, the terminal 200 selects an appropriate mode from among a plurality of modes (two modes in FIG. 12) in accordance with the operating environment (the expected environment (scenario)) of the terminal 200 and performs 1-symbol PUCCH transmission on the basis of the selected mode.

In this manner, the terminal 200 can give priority to one of a reduction of the PAPR and an improvement of the resource utilization efficiency in accordance with the situation of the terminal 200 (for example, a noise power limited environment or an interference power limited environment) and achieves a reduction of the PAPR or an improvement of the resource utilization efficiency. Thus, the terminal 200 can appropriately perform one of transmission of HARQ-ACK, transmission of SR, and simultaneous transmission of SR and HARQ-ACK in 1-symbol PUCCH. That is, according to the present embodiment, in addition to HARQ-ACK, SR can be appropriately transmitted in 1-symbol PUCCH.

Number of Modes

Note that the number of modes that can be set as a 1-symbol PUCCH channel configuration for transmitting 1-bit or 2-bit UCI is not limited to two as illustrated in FIG. 12. Three or more modes may be set. By increasing the number of modes that can be set, it is possible to set a more detailed PUCCH channel configuration suitable for the operating environment of the terminal 200.

Combination of Modes

In addition, the PUCCH channel configuration modes that can be set for the terminal 200 are not limited to the combination of Option 1-1 and Option 4-2 illustrated in FIG. 12. Any combination selected from Options 1-1, 1-2, 4-1, and 4-2 can be used. That is, a combination of modes with different PAPRs or different resource utilization efficiencies can be set.

For example, one of Options 1 (Option 1-1 and 1-2) may be combined with one of Options 4 (Option 4-1 and 4-2), such as a combination of Option 1-1 and Option 4-1, a combination of Option 1-2 and Option 4-1, or a combination of Option 1-2 and Option 4-2. More specifically, it can be said that the combination of Option 1-1 and Option 4-1 and the combination of Option 1-2 and Option 4-1 are combinations that put more weight on the resource utilization efficiency. In contrast, it can be said that the combination of Option 1-2 and Option 4-1 is a combination that puts more weight on a reduction of the PAPR.

Alternatively, a combination of Option 1-1 and Option 1-2 or a combination of Option 4-1 and Option 4-2 may be used. It can be said that the combination of Option 1-1 and Option 1-2 is a combination that puts more weight on the resource utilization efficiency. In contrast, it can be said that the combination of Option 4-1 and Option 4-2 is a combination that puts more weight on a reduction of the PAPR.

Modification of Option 1-1

In Option 1-1, the RS sequence for HARQ-ACK and the RS sequence for SR may be a common sequence. In this case, if transmission of SR and transmission of HARQ occur simultaneously, a total of three sequences, that is, a HARQ-ACK sequence, an SR sequence, and a common RS sequence, are simultaneously transmitted from the terminal 200. That is, in this case, the HARQ resource and the SR resource are allocated to the same PRB. As described above, since RSs used for 1-symbol PUCCH transmission are common, the received signal processing performed by the base station 100 can be simplified.

Second Embodiment

A base station and a terminal according to the present embodiment have the same basic configuration as the base station 100 and the terminal 200 according to the first embodiment. Accordingly, the base station and the terminal are described below with reference to FIG. 9 and FIG. 10.

According to the present embodiment, like the first embodiment, if transmission of HARQ-ACK and transmission of SR occur simultaneously, the terminal 200 allocates UCI including at least one of HARQ-ACK and SR to a PUCCH resource and performs transmission on the basis of, among a plurality of modes (Options) relating to the channel configuration of 1-symbol PUCCH, the one selected in accordance with the operating environment of the terminal 200.

In addition, if one of transmission of HARQ-ACK and transmission of SR occurs, the terminal 200 allocates the UCI to the PUCCH resource on the basis of the mode common to all of the operating environments of the terminal 200 and performs transmission.

Hereinafter, like the first embodiment (FIG. 12), the case is described where as illustrated in FIG. 13, two modes, Option 1-1 and Option 4-2, are set as the mode (Option) set when the transmission of HARQ-ACK and the transmission of SR occur simultaneously, and Option 4 (for example, either Option 4-1 or Option 4-2) is set as the above-mentioned common mode.

That is, as illustrated in FIG. 13, in the case where transmission of SR and transmission of HARQ-ACK occur simultaneously, if it is expected that the terminal 200 is in an interference power limited environment, the terminal 200 performs 1-symbol PUCCH transmission on the basis of Option 1-1 having the best resource efficiency. In contrast, if it is expected that the terminal 200 is in a noise power limited environment, the terminal 200 performs 1-symbol PUCCH transmission on the basis of Option 4-2 that can most reduce the PAPR.

In this manner, when the terminal 200 simultaneously transmits SR and HARQ-ACK, the terminal 200 sets the mode in accordance with the operating environment of the terminal 200 in the cell, as in the first embodiment. Thus, a PUCCH channel configuration suitable for the operating environment can be set. As a result, the transmission power efficiency of the terminal 200 or the resource utilization efficiency of the network can be improved.

In contrast, as illustrated in FIG. 13, when one of transmission of HARQ-ACK and transmission of SR occurs, the terminal 200 sets Option 4 as the common mode and performs 1-symbol PUCCH transmission.

Note that the occurrence of simultaneous transmission of HARQ-ACK and SR in the terminal 200 can be avoided to some extent by scheduling executed in the base station 100. That is, it is possible to reduce the frequency of occurrence of simultaneous transmission of HARQ-ACK and SR in terminal 200. That is, in the terminal 200, the frequency of occurrence of either HARQ-ACK transmission or SR transmission increases. Therefore, by making the mode used when either HARQ-ACK transmission or SR transmission occurs common regardless of the operating environment of the terminal 200, the terminal 200 can use the PUCCH channel configuration in the common mode as frequently as possible. Consequently, the processing performed by the terminal 200 can be simplified.

Method for Determining Terminal Mode

Methods 1 to 3 are described below as an example of the methods for determining which one of two modes the terminal 200 uses when simultaneously transmitting SR and HARQ-ACK.

Method 1

The mode may be informed to the terminal 200 by signaling from the base station 100 (for example, a higher-layer indication specific to the group, dynamic signaling specific to the group (Group common PDCCH), or a higher-layer indication specific to the terminal or dynamic signaling specific to the terminal (DCI: Downlink Control Information)). The terminal 200 identifies which one of the two modes to employ for the operation on the basis of the information regarding the mode informed from the base station 100.

Method 2

Alternatively, the terminal 200 may determine which one of the two modes to employ without relying on explicit signaling from the base station 100. For example, when the two modes, Option 1-1 and Option 4-2, are settable, the terminal 200 determines the mode in accordance with the presence or absence of an RS to be transmitted. This is because for example, as illustrated in FIG. 1 and FIG. 2, in 1-symbol PUCCH transmission, transmission of RS occurs in Option 1-1 (Option 1), whereas transmission of RS does not occur in Option 4-2 (Option 4). That is, the terminal 200 operates on the basis of Option 1-1 if there is an RS. However, the terminal 200 operates on the basis of Option 4-2 if there is no RS.

Method 3

In addition, when multiple random access channel (RACH) resources are set, the terminal 200 may determine which one of the two modes to employ on the basis of the RACH resources. The base station 100 informs the terminal 200 of the plurality of RACH resources by cell-specific or group-specific higher-layer indication.

In this case, each of the RACH resources is linked to RSRP/RSRQ measured by the terminal 200. In addition, the two modes settable by the terminal 200 are associated with the RACH resources. That is, the two modes settable by the terminal 200 are further associated with the RSRP/RSRQ linked to the RACH resources.

Therefore, the terminal 200 measures its own RSRP/RSRQ, selects the RACH resource corresponding to the measured RSRP/RSRQ, and determines the mode relating to the 1-symbol PUCCH channel configuration used to transmit 1-bit or 2-bit UCI that the terminal 200 uses on the basis of the selected RACH resource.

Method 4

NR supports an operation with multiple subcarrier spacing (for example, 15 kHz, 30 kHz, and 60 kHz). If, for example, two modes, Option 1-1 and Option 4-2, are settable, the terminal 200 may determine the mode according to the subcarrier spacing at the time of PUCCH transmission.

Like the above-described methods 2 to 4, the methods for determining the mode not relying on explicit signaling have an advantage of reducing the overhead of signaling.

As described above, like the first embodiment, according to the present embodiment, when transmitting HARQ-ACK and SR simultaneously, the terminal 200 selects an appropriate mode from among a plurality of modes (two modes in FIG. 13) in accordance with the operating environment (the expected environment (scenario)) of the terminal 200 and performs 1-symbol PUCCH transmission on the basis of the selected mode. In this manner, like the first embodiment, the terminal 200 can give priority to one of a reduction of the PAPR and an improvement of the resource utilization efficiency in accordance with the situation of the terminal 200. As a result, the terminal 200 can appropriately perform simultaneous transmission of SR and HARQ-ACK in 1-symbol PUCCH.

In addition, according to the present embodiment, when one of transmission of HARQ-ACK and transmission of SR occurs, the terminal 200 sets the common mode for any one of the operating environments of the terminal 200. In this manner, the channel configuration of 1-symbol PUCCH in terminal 200 can be made as common as possible. As a result, the transmission processing of 1-symbol PUCCH can be simplified.

Number of Modes

Note that the number of modes that can be set as a 1-symbol PUCCH channel configuration for transmitting 1-bit or 2-bit UCI is not limited to two as illustrated in FIG. 13. Three or more modes may be set. By increasing the number of modes that can be set, it is possible to set a more detailed PUCCH channel configuration suitable for the operating environment of the terminal 200.

[Combination of Modes]

In addition, when SR and HARQ-ACK are simultaneously transmitted, the PUCCH channel configuration modes that can be set for the terminal 200 are not limited to the combination of Option 1-1 and Option 4-2 illustrated in FIG. 13. Any combination selected from Options 1-1, 1-2, 4-1, and 4-2 can be used. That is, a combination of modes with different PAPRs or different resource utilization efficiencies can be set.

For example, one of Options 1 (Option 1-1 and 1-2) may be combined with one of Options 4 (Option 4-1 and 4-2), such as a combination of Option 1-1 and Option 4-1, a combination of Option 1-2 and Option 4-1, or a combination of Option 1-2 and Option 4-2. More specifically, it can be said that the combination of Option 1-1 and Option 4-1 and the combination of Option 1-2 and Option 4-1 are combinations that put more weight on the resource utilization efficiency. In contrast, it can be said that the combination of Option 1-2 and Option 4-1 is a combination that puts more weight on a reduction of the PAPR.

Alternatively, a combination of Option 1-1 and Option 1-2 or a combination of Option 4-1 and Option 4-2 may be used. It can be said that the combination of Option 1-1 and Option 1-2 is a combination that puts more weight on the resource utilization efficiency. In contrast, it can be said that the combination of Option 4-1 and Option 4-2 is a combination that puts more weight on a reduction of the PAPR.

Common Mode

Furthermore, the common mode set when only one of HARQ-ACK and SR is transmitted is not limited to Option 4 illustrated in FIG. 13. For example, the common mode may be Option 1 or the method described in a third embodiment (Proposal 3). When Option 1 is set as the common mode, it can be said that a method that gives priority to the resource utilization efficiency is employed. In contrast, when Option 4 is set as the common mode, it can be said that a method that gives priority to a reduction of the PAPR is employed.

Third Embodiment

A base station and a terminal according to the present embodiment have the same basic configurations as the base station 100 and the terminal 200 according to the first embodiment. Accordingly, the base station and the terminal are described below with reference to FIG. 9 and FIG. 10.

According to the present embodiment, the terminal 200 supports a single mode as the channel configuration of 1-symbol PUCCH for transmitting 1-bit or 2-bit UCI. The 1-symbol PUCCH channel configuration of the single mode is set to be the channel configuration that can provide both an improvement of the resource utilization efficiency and a reduction of the PAPR in consideration of the trade-off between an improvement of the resource utilization efficiency and a reduction of the PAPR, as compared with Option 1-1, 1-2, 4-1, and 4-2.

More specifically, according to the present embodiment, three sequences, that is, a sequence for RS (an RS sequence), a sequence for modulating and transmitting HARQ-ACK (an HARQ-ACK sequence), and a sequence for transmitting SR (an SR sequence), are reserved. That is, an RS resource, an HARQ-ACK resource, and an SR resource are allocated to the terminal 200.

If transmission of SR does not occur and transmission of HARQ-ACK occurs, the terminal 200 transmits HARQ-ACK by using the RS sequence (the RS resource) and the HARQ-ACK sequence (the HARQ-ACK resource). At this time, the HARQ-ACK sequence is BPSK or QPSK modulated by UCI. That is, the terminal 200 simultaneously transmits two sequences, that is, the UCI sequence and the RS sequence.

In addition, if transmission of SR occurs and transmission of HARQ-ACK does not occur, the terminal 200 transmits SR by using the RS sequence (the RS resource) and the SR sequence (the SR resource). That is, the terminal 200 simultaneously transmits two sequences, that is, the SR sequence and the RS sequence.

Furthermore, if transmission of SR and transmission of HARQ-ACK occur simultaneously, the terminal 200 transmits HARQ-ACK by using the RS sequence (the RS resource) and the SR sequence (the SR resource). At this time, the SR sequence is BPSK or QPSK modulated by HARQ-ACK. That is, the terminal 200 simultaneously transmits two sequences, that is, the SR sequence and the RS sequence.

That is, the terminal 200 transmits UCI (HARQ-ACK or SR) and RS by using one of the HARQ-ACK resource and the SR resource and the RS resource in accordance with the transmission states of SR and HARQ-ACK.

Figures 14, 15:
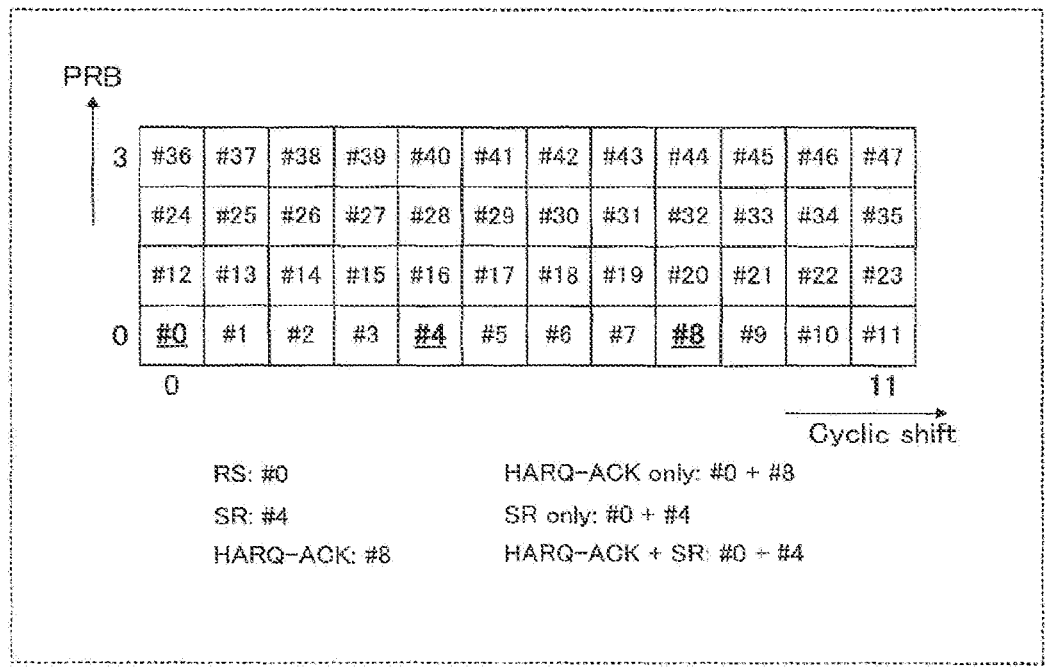
FIG. 14 illustrates an example of the channel configuration of a 1-symbol PUCCH according to a third embodiment.
FIG. 15 illustrates an example of a mode relating to the channel configuration of the 1-symbol PUCCH according to the third embodiment.

FIG. 14 illustrates an example of PUCCH resources in the case of performing orthogonal multiplexing between sequences by using a CAZAC code sequence and cyclic shift when the PUCCH resource size is set to 1 PRB.

In FIG. 14, PUCCH resource #0 (PRB #0, Cyclic shift #0), PUCCH resource #4 (PRB #0, Cyclic shift #4), and HARQ-PUCCH resource #8 (PRB #0, Cyclic shift #8) are allocated to the terminal 200 (UE) as the RS resource, the SR resource, and the ACK resource, respectively.

That is, in FIG. 14, if transmission of SR does not occur and transmission of HARQ-ACK occurs, the terminal 200 uses PUCCH resource #0 (the RS resource) and PUCCH resource #8 (the HARQ-ACK resource) and transmits the HARQ-ACK (ACK or NACK) and RS. If transmission of SR occurs and transmission of HARQ-ACK does not occur, the terminal 200 uses PUCCH resource #0 (the RS resource) and PUCCH resource #4 (the SR resource) and transmits SR and RS. If transmission of SR and transmission of HARQ-ACK occurs simultaneously, the terminal 200 uses PUCCH resource #0 (the SR resource) and PUCCH resource #4 (the RS resource) and transmits HARQ-ACK (ACK or NACK) and RS.

As described above, according to the present embodiment, in any one of transmission of HARQ-ACK, transmission of SR, and simultaneous transmission of HARQ-ACK and SR, an RS sequence transmitted simultaneously with the HARQ-ACK sequence or the SR sequence is a common sequence. That is, in LTE, different RS sequences are used at the time of transmission of only HARQ-ACK and at the time of simultaneous transmission of HARQ-ACK and SR. However, according to the present embodiment, a common RS sequence is used when transmission of SR does not occur and transmission of HARQ-ACK occurs and when transmission of SR and transmission of HARQ-ACK occur simultaneously. Therefore, as illustrated in FIG. 14, the SR resource and the HARQ-ACK resource are allocated to the same PRB.

The number of transmission sequences and the number of sequences allocated per UE in each of the above-described channel configuration according to the third embodiment (referred to as "Proposal 3"), Option 1-1, Option 1-2, Option 4-1, and Option 4-2 can be summarized as illustrated in FIG. 15.

In Proposal 3, an HARQ-ACK resource, an SR resource, and an RS resource are reserved for each of the UEs. Accordingly, in Proposal 3, the number of sequences allocated per UE is 3 (refer to FIG. 15).

In addition, in Proposal 3, if transmission of SR does not occur and transmission of HARQ-ACK occurs, the terminal 200 transmits the HARQ-ACK and the RS by using the HARQ-ACK resource and RS resource. Accordingly, two sequences, a UCI sequence and an RS sequence, are transmitted simultaneously (refer to FIG. 15). Alternatively, if transmission of SR occurs and transmission of HARQ-ACK does not occur, the terminal 200 transmits the SR and RS by using the SR resource and the RS resource. Accordingly, the terminal 200 transmits two sequences, an SR sequence and an RS sequence, simultaneously (refer to FIG. 15). Still alternatively, if transmission of SR and transmission of HARQ-ACK occur simultaneously, the terminal 200 transmits the HARQ-ACK by using the SR resource and the RS resource. Accordingly, the terminal 200 transmits two sequences, the SR sequence and the RS sequence, simultaneously (refer to FIG. 15).

As a result, as illustrated in FIG. 15, in the channel configuration according to the present embodiment (Proposal 3), the number of simultaneously transmitted sequences (two sequences) is reduced as compared with that in Option 1-1 (four sequences). Thus, the PAPR can be reduced. In contrast, as illustrated in FIG. 15, in the channel configuration according to the present embodiment (Proposal 3), the number of simultaneously transmitted sequences (two sequences) is increased as compared with that in Option 4-1 (one or two sequences) or Option 4-2 (one sequence). Thus, it can be said that the resource utilization efficiency is improved. In addition, as illustrated in FIG. 15, in Option 1-2, four sequences need to be reserved per UE, whereas only three sequences need to be reserved in the channel configuration according to the present embodiment (Proposal 3), because the RS sequence is commonly used for the SR and HARQ-ACK. Thus, it can be said that the resource utilization efficiency is improved.

As described above, according to the present embodiment, the PUCCH channel configuration can be made common regardless of the operating environment (the scenario) of the terminal 200 or the transmission states of HARQ-ACK and SR. For this reason, a complicated PUCCH design (a complicated resource allocation or signaling method) can be avoided, for example.

In addition, according to the present embodiment, the RS used for 1-symbol PUCCH transmission is common, regardless of the transmission states, that is, transmission of HARQ-ACK, transmission of SR, and simultaneous transmission of SR and HARQ-ACK. Consequently, the present embodiment has the advantage of simplifying the signal receiving process performed by the base station 100. Furthermore, by reducing the number of simultaneously transmitted sequences to two in each of transmission states (transmission of HARQ-ACK and transmission of SR), a high resource utilization efficiency can be achieved while preventing an increase in PAPR, as compared with Option 1-1.

Modification of Third Embodiment

The third embodiment supports one mode (Proposal 3) as the channel configuration of the 1-symbol PUCCH. In addition, according to the third embodiment, description of the channel configuration of the 1-symbol PUCCH has been made with reference to the case where two sequences are transmitted in either a transmission state in which transmission of HARQ-ACK occurs or a transmission state in which transmission of SR occurs so that both an improvement of the resource utilization efficiency and a reduction of the PAPR are achieved in some extent in one mode in consideration of trade-off between the resource utilization efficiency and the PAPR.

However, in the above mode, two sequences are transmitted in either a transmission state in which transmission of HARQ-ACK occurs or a transmission state in which transmission of SR occurs. Consequently, the PAPR increases, as compared with the case where one sequence is transmitted. Therefore, the coverage may be degraded in an environment where limitation of the transmission power is very severe.

Therefore, according to a modification of the third embodiment, to prevent an increase in PAPR, the terminal 200 transmits only one sequence at the time of transmission of 1-symbol PUCCH in an environment where limitation of the transmission power is very severe. That is, according to the modification of the third embodiment, as illustrated in FIG. 16, in addition to the above-described one mode (Proposal 3), a mode (an additional mode), Option 4-2, can be set to transmit only one sequence. Option 4-2 is used in an environment where limitation of the transmission power is very severe.

However, in Option 4-2, the deterioration of resource utilization efficiency significantly increases (especially when 2-bit UCI is transmitted) (refer to, for example, FIG. 15). Accordingly, the mode of Option 4-2 may be used only when 1-bit UCI is transmitted.

The following methods 1 to 3 may be used as a method for determining which of the two modes (Proposal 3 and Option 4-2) the terminal 200 uses.

Method 1

The mode may be informed to the terminal 200 by signaling from the base station 100 (for example, a higher-layer indication specific to the group, dynamic signaling specific to the group (Group common PDCCH), or a higher-layer indication specific to the terminal or dynamic signaling specific to the terminal (DCI: Downlink Control Information)). The terminal 200 identifies which one of the two modes to employ for the operation on the basis of the information regarding the mode informed from the base station 100.

Method 2

Alternatively, the terminal 200 may determine which one of the two modes to employ without relying on explicit signaling from the base station 200. For example, when two modes, that is, Proposal 3 and Option 4-2, are settable, the terminal 200 determines the mode in accordance with the presence or absence of RS to be transmitted. This is because for example, as illustrated in FIG. 14, in 1-symbol PUCCH transmission, transmission of RS occurs in Proposal 3, whereas transmission of RS does not occur in Option 4-2. That is, the terminal 200 operates on the basis of Proposal 3 if there is an RS. However, the terminal 200 operates on the basis of Option 4-2 if there is no RS.

Method 3

In addition, when multiple RACH resources are set, the terminal 200 may determine which one of the two modes to employ on the basis of the RACH resources. The base station 100 informs the terminal 200 of the plurality of RACH resources by cell-specific or group-specific higher-layer indication.

In this case, each of the RACH resources is linked to RSRP/RSRQ measured by the terminal 200. In addition, the two modes settable by the terminal 200 are associated with the RACH resources. That is, the two modes settable by the terminal 200 are further associated with the RSRP/RSRQ linked to the RACH resources.

Therefore, the terminal 200 measures its own RSRP/RSRQ, selects the RACH resource corresponding to the measured RSRP/RSRQ, and determines the mode related to the 1-symbol PUCCH channel configuration used to transmit 1-bit or 2-bit UCI that the terminal 200 uses on the basis of the selected RACH resource.

Method 4

NR supports an operation with multiple subcarrier spacing (for example, 15 kHz, 30 kHz, and 60 kHz). If, for example, two modes, Option 1-1 and Option 4-2, are settable, the terminal 200 may determine the mode according to the subcarrier spacing at the time of PUCCH transmission.

Like the above-described methods 2 to 4, the methods for determining the mode not relying on explicit signaling have an advantage of reducing the overhead of signaling.

Fourth Embodiment

A base station and a terminal according to the present embodiment have the same basic configuration as the base station 100 and the terminal 200 according to the first embodiment. Accordingly, the base station and the terminal are described below with reference to FIG. 9 and FIG. 10.

According to the first to third embodiments, when the terminal 200 transmits a plurality of sequences simultaneously, the PAPR value may increase or decrease in accordance with the combination of the sequences transmitted simultaneously. For example, when a plurality of sequences are generated by cyclic shift of the same CAZAC sequence, the value of PAPR tends to increase in the case of the combination of consecutive cyclic shift sequences, and the value of PAPR tends to decrease in the case of the combination of non-continuous cyclic shift sequences.

Therefore, according to the present embodiment, the sequences used for transmission of the 1-symbol PUCCH are divided into a plurality of groups. That is, a plurality of sequences used for PUCCH resources are divided into a plurality of groups according to the PAPR of a combination of sequences in the same group. Thereafter, among the plurality of groups, the sequences in the same group are allocated to the same UE.

For example, the plurality of groups may include a sequence group including the sequences each having PAPR that decreases when simultaneously transmitted (that is, a group suitable for an interference power limited environment) and a sequence group including sequences each having PAPR that increases when simultaneously transmitted (that is, a group usable even in a noise power limited environment).

Figure 17:
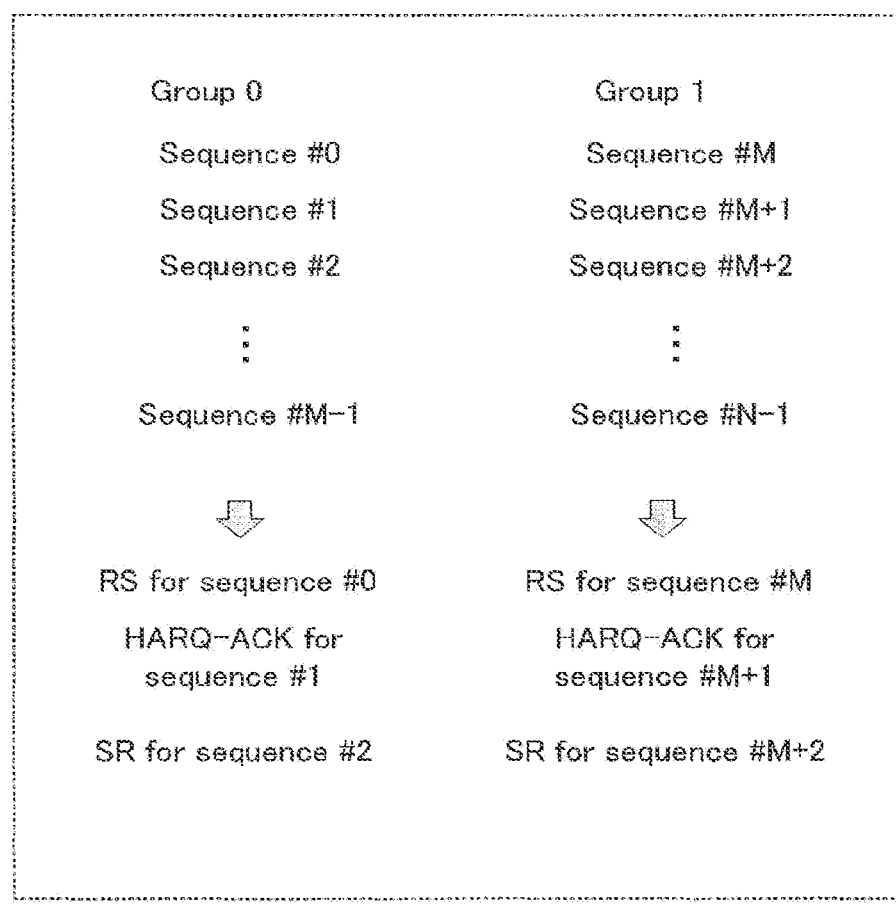
FIG. 17 illustrates an example of a sequence group according to a fourth embodiment.

For example, among the plurality of sequence groups (for example, Group 0 and Group 1 illustrated in FIG. 17), the one suitable for the operating environment of the terminal 200 is allocated to the terminal 200. Then, the terminal 200 simultaneously transmits a plurality of sequences included in the same sequence group.

As described above, according to the present embodiment, by setting a plurality of sequence groups according to the value of PAPR obtained when a plurality of sequences are transmitted simultaneously, allocation of sequences suitable for the operating environment of the terminal 200 in a cell can be achieved. Thus, the transmission power efficiency of the terminal 200 can be improved.

In addition, to randomize the inter-sequence interferences between the cells, sequence hopping can be applied so that the sequence number is changed at predetermined time intervals. In this case, sequence hopping is performed between the sequences within the same sequence group. In this manner, it can be avoided that even when, for example, sequence hopping is performed on a sequence group including a sequence having a PAPR that decreases when they are simultaneously transmitted, the PAPR value for the simultaneously transmitted sequences increases.

Note that the predetermined time interval at which sequence hopping is performed may be, for example, a time unit, such as symbol, minislot, slot, subframe, or frame.

Fifth Embodiment

A base station and a terminal according to the present embodiment have the same basic configuration as the base station 100 and the terminal 200 according to the first embodiment. Accordingly, the base station and the terminal are described below with reference to FIG. 9 and FIG. 10.

According to the fifth embodiment, the sequences allocated to the same UE in the first to third embodiments are within the same PRB or the same coherent band.

In addition, according to the fifth embodiment, it is assumed that the transmission power difference between the sequences is known. For example, the transmission power of each of the sequences may be the same (that is, the transmission power difference between the sequences is 0).

Suppose that two sequences for the same UE are allocated outside the coherent band. In this case, the power detection performance deteriorates due to the influence of the channel frequency selectivity in the power detection performed by the base station. In addition, when the transmission power difference between the sequences is not known, deterioration of the power detection performance of the base station similarly occurs.

In contrast, according to the present embodiment, among a plurality of sequences used for PUCCH resources, the sequences in the same PRB or the sequences in the coherent band are allocated to the same UE (the terminal 200). Thus, power detection can be accurately performed without being affected by the channel frequency selectivity in power detection performed by the base station 100. In addition, since the transmission power difference between the sequences is known, the power detection can be performed by the base station 100 with high accuracy.

As described above, according to the present embodiment, by allocating the sequences in the same PRB or the same coherent band or making the transmission power difference between the sequences known, deterioration of the power detection characteristics required in any one of the first to third embodiments can be prevented.

Note that the term "coherent band" can be also referred to as a "near band (PRB)" or a neighboring band (PRB).

Modification of Fifth Embodiment

According to the modification of the fifth embodiment, the case where different PRB sequences are allocated to the same UE is described.

If different PRB sequences are allocated to the same UE, the method for allocating, for example, any one of PRBs in the system band to each of an SR resource and an ACK/NACK resource can maximize the flexibility of resource allocation. However, the signaling overhead for allocating PRBs is increased.

Therefore, according to the modification of the fifth embodiment, if different PRB sequences (in this example, two sequences) are allocated to the same UE, the two sequences are determined to be near PRBs or neighboring PRBs. The sequences of near PRBs or neighboring PRBs may be, for example, sequences within a coherent band.

For example, by setting near PRBs or neighboring PRBs allocated to the same UE, it is not necessary to independently allocate any PRB in the system band to each of the SR resource and ACK/NACK resource for the same UE. Moreover, a notification of a PRB position of one of the SR resource and ACK/NACK resource can be sent by using the position relative to the other. For example, the base station 100 may notify the terminal 200 of a PRB to which the SR resource is to be allocated by using an offset from the PRB to which the ACK/NACK resource is to be allocated. Conversely, the base station 100 may notify the terminal 200 of a PRB to which the ACK/NACK resource is to be allocated by using an offset from the PRB to which the SR resource is to be allocated. In addition, since different PRB sequences to be allocated to the same UE are close PRBs or neighboring PRBs, the range of the offset value may be several PRBs at most.

As described above, according to the modification of the fifth embodiment, when different PRB sequences among a plurality of sequences used for PUCCH resources are allocated to the same UE, the position of at least one of the different PRBs corresponding to the sequences allocated to the same UE is indicated by the offset value indicating a position relative to the position of another PRB. As a result, the signaling overhead of a notification of the PRB offset value can be reduced, as compared with the case where a notification of one of all the PRB in the system band is provided.

For example, in the case where the system band is configured with 100 PRBs, the signaling overhead is ceil(log 2 (100))=7 bits when any one of PRBs in the system band is allocated. In contrast, according to the modification of the fifth embodiment, when the offset is set by using four patterns (−2, −1, 0, 1) as illustrated in FIG. 18, the signaling overhead is only 2 bits.

Figure 18:
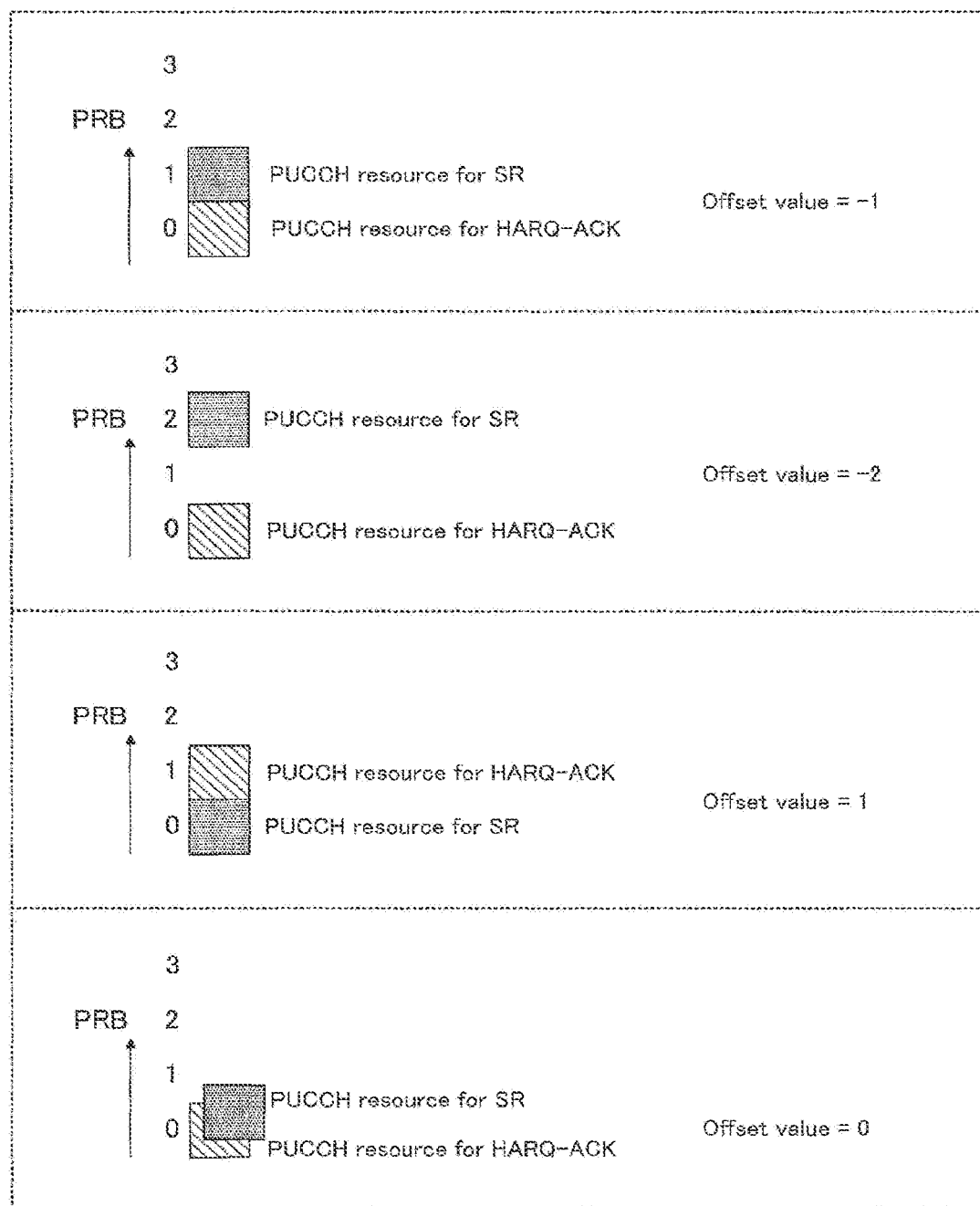
FIG. 18 illustrates an example of the channel configuration of PUCCH according to a modification of a fifth embodiment.

Note that FIG. 18 illustrates an example in which a notification of the PRB of the ACK/NACK resource is provided by using the offset based on the PRB of the SR resource. However, the notification technique is not limited thereto, and the base station 100 may send a notification of the PRB of the SR resource by using an offset based on the PRB of the ACK/NACK resource. Note that the offset values (−2, −1, 0, 1) illustrated in FIG. 18 are only an example, and the offset values are not limited thereto.

Alternatively, the offset value may be a value determined by the standard or may be a value set by the RRC signaling. Still alternatively, if the same PRB sequence is allocated to the same UR, the value of the above-described PRB offset may be used as the cyclic shift offset.

The embodiments of the present disclosure have been described above.

Other Embodiments (1) While the above embodiments have been described with reference to the case where a plurality of sequences are generated by cyclic shift of the same CAZAC sequence, the method for generating a plurality of sequences is not limited to the above-described method. For example, a plurality of sequences may be generated by CAZAC sequences of different sequence numbers. Alternatively, a plurality of sequences may be generated by the same sequence of different PRBs. Still alternatively, a plurality of sequences may be generated by Comb within the same PRB. Yet still alternatively, a plurality of sequences may be defined by using a combination of these methods.

For example, when the PUCCH resource size is X[RE], X sequences having different cyclic shift values can be generated by using the method for generating a plurality of sequences by cyclic shift of a CAZAC sequence having a sequence length of X. In addition, when a plurality of sequences are generated by Comb in the same PRB, a total of X sequences are generated by X/2 sequences having different cyclic shifts, which are generated by cyclic shift of a CAZAC sequence having a sequence length of X/2, and two Combs.

(2) While the above embodiments have been described with reference to SR and HARQ-ACK serving as uplink control information (UCI) transmitted by the terminal 200, the uplink control information transmitted by terminal 200 is not limited to SR and HARQ-ACK. Other uplink control information (for example, CSI) may be used.

(3) The present disclosure can be implemented with software, hardware, or software in cooperation with hardware. Each of the functional blocks used in the description of the above embodiments may be partially or entirely implemented as an LSI which is an integrated circuit, and each of the processes described in the above embodiments may be partially or entirely controlled by a single LSI or a combination of LSIs. The LSI may be composed of individual chips or may be composed of a single chip so as to include some or all of the functional blocks. The LSI may have a data input and a data output. The term "LSI" is also referred to as an "IC", a "system LSI", a "super LSI" or an "ultra LSI", depending on the level of integration. In addition, the circuit integration is not limited to LSI and may be achieved by dedicated circuitry or a general-purpose processor other than an LSI. An FPGA (field programmable gate array), which is programmable after fabrication of the LSI, or a reconfigurable processor which allows reconfiguration of connections and settings of circuit cells in LSI may be used. The present disclosure may be implemented as digital processing or analog processing. Moreover, should a circuit integration technology replacing LSI appear as a result of advancements in semiconductor technology or other technologies derived from the technology, the functional blocks could be integrated using such a technology. Another possibility is the application of biotechnology, for example.

According to the present disclosure, a terminal includes circuitry and a transmitter. The circuitry allocates uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of the terminal. The transmitter transmits the uplink control information.

According to the present disclosure, a terminal includes circuitry and a transmitter. The circuitry allocates uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of the terminal when transmission of the response signal and transmission of the uplink radio resource allocation request signal occur simultaneously. The transmitter transmits the uplink control information.

According to the present disclosure, a terminal includes circuitry and a transmitter. The circuitry allocates uplink control information including at least one of a response signal responsive to downlink data and an uplink radio resource allocation request signal to a resource for an uplink control channel. The transmitter transmits the uplink control channel. A first resource used to transmit the response signal, a second resource used to transmit the radio resource allocation request signal, a third resource used to transmit a reference signal frequency-multiplexed with the uplink control information are allocated to the terminal. The terminal transmits the uplink control information and the reference signal by using one of the first resource and the second resource and the third resource. The first resource and the second resource are allocated to the same resource block.

In the terminal according to the present disclosure, the circuitry allocates the uplink control information to the resource for the uplink control channel on the basis of a mode relating to the channel configuration common to all of operating environments of the terminal when one of transmission of the response signal and transmission of the radio resource allocation request signal occurs.

In the terminal according to the present disclosure, the plurality of modes include at least a first mode and a second mode having a maximum peak-to-average power ratio (PAPR) lower than that of the first mode. In an environment in which the operating environment of the terminal limits interference, the circuitry allocates the uplink control information to the uplink resource on the basis of the first mode. In an environment in which the operating environment of the terminal limits power, the circuitry allocates the uplink control information to the uplink resource on the basis of the second mode.

In the terminal according to the present disclosure, the plurality of modes include at least a first mode and a second mode having uplink resource utilization efficiency lower than that of the first mode. In an environment in which the operating environment of the terminal limits interference, the circuitry allocates the uplink control information to the uplink resource on the basis of the first mode. In an environment in which the operating environment of the terminal limits power, the circuitry allocates the uplink control information to the uplink resource on the basis of the second mode.

In the terminal according to the present disclosure, a plurality of sequences used for the resources of an uplink control channel are divided into a plurality of groups, and the sequences in the same group among the plurality of groups are allocated to the same terminal.

In the terminal according to the present disclosure, among a plurality of sequences used for the resources of an uplink control channel, the sequences in the same resource block or the sequences in a coherent band are allocated to the same terminal.

In the terminal according to the present disclosure, among a plurality of sequences used for the resources of an uplink control channel, the sequences in different resource blocks are allocated to the same terminal. Among the different resource blocks, the position of at least one of the resource blocks is indicated by an offset value indicative of a position relative to the position of another resource block.

According to the present disclosure, a communication method includes allocating uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of a terminal and transmitting the uplink control information.

According to the present disclosure, a communication method includes allocating uplink control information including at least one of a response signal responsive to downlink data and an uplink radio resource allocation request signal to a resource for an uplink control channel on the basis of a mode selected from among a plurality of modes relating to the channel configuration of the uplink control channel in accordance with an operating environment of the terminal when transmission of the response signal and transmission of an uplink radio resource allocation request signal occur simultaneously and transmitting the uplink control information.

According to the present disclosure, a communication method includes allocating uplink control information including at least one of a response signal responsive to downlink data and an uplink radio resource allocation request signal to a resource for an uplink control channel, transmitting the uplink control channel, allocating, to a terminal, a first resource used to transmit the response signal, a second resource used to transmit the radio resource allocation request signal, and a third resource used to transmit a reference signal frequency-multiplexed with the uplink control information, and transmitting the uplink control information and the reference signal by using one of the first resource and the second resource and the third resource. The first resource and the second resource are allocated to the same resource block.

An embodiment of the present disclosure is useful for a mobile communication system.

REFERENCE SIGNS LIST 100 base station
101, 209 control unit
102 data generation unit
103, 107, 110, 213 encoding unit
104 retransmission control unit
105, 108, 111, 211, 214 modulation unit
106 higher-layer control signal generation unit
109 downlink control signal generation unit
112, 215 signal allocation unit
113, 216 IFFT unit
114, 217 transmitting unit
115, 201 antenna
116, 202 receiving unit
117, 203 FFT unit
118, 204 extraction unit
119 SR detection unit
120 PUCCH demodulation/decoding unit
121 determination unit
200 terminal
205 downlink control signal demodulation unit
206 higher-layer control signal demodulation unit
207 downlink data signal demodulation unit
208 error detection unit
210 SR generation unit
212 HARQ-ACK generation unit

The invention claimed is:

1. A terminal comprising:
   circuitry, which, in operation, generates, based on sequence selection, uplink control information including HARQ-ACK for downlink data; and
   a transmitter, which, in operation, transmits the uplink control information using a physical uplink control channel (PUCCH) of one symbol,
   wherein a sequence for the uplink control information including the HARQ-ACK without a scheduling request is different from a sequence for the uplink control information including the HARQ-ACK with the scheduling request, a physical resource block where the uplink control information including the HARQ-ACK with the scheduling request is transmitted is same as a physical resource block where the uplink control information including the HARQ-ACK without the scheduling request is transmitted, and the uplink control information including the HARQ-ACK with the scheduling request is generated using either one of:
   the sequence for the uplink control information including the HARQ-ACK with the scheduling request; or
   both the sequence for the uplink control information including the HARQ-ACK without the scheduling request and a sequence for the uplink control information including the scheduling request,
   in accordance with an operating environment of the terminal.

2. The terminal according to claim 1, wherein the number of bits of the HARQ-ACK is 1 or 2.

3. The terminal according to claim 1, wherein the number of terminals multiplexed in the same physical resource block is up to 6 for the HARQ-ACK with 1 bit.

4. The terminal according to claim 1, wherein the sequence is a sequence including a cyclic shift or a sequence defined by a cyclic shift.

5. The terminal according to claim 1, wherein a sequence for the uplink control information including ACK as the HARQ-ACK is different from a sequence for the uplink control information including NACK as the HARQ-ACK.

6. The terminal according to claim 1, wherein the number of sequences assigned to one terminal is 4 for the HARQ-ACK with 1 bit, and the number of sequences assigned to one terminal is 8 for the HARQ-ACK with 2 bits.

7. The terminal according to claim 1, comprising:
a receiver, which, in operation, receives information related to a resource of the PUCCH,
wherein the uplink control information is generated and transmitted based on the information.

8. The terminal according to claim 7, wherein the information includes information related to a cyclic shift used in the sequence.

9. A communication method comprising:
generating, based on sequence selection, uplink control information including HARQ-ACK for downlink data; and
transmitting the uplink control information using a physical uplink control channel (PUCCH) of one symbol,
wherein a sequence for the uplink control information including the HARQ-ACK without a scheduling request is different from a sequence for the uplink control information including the HARQ-ACK with the scheduling request, a physical resource block where the uplink control information including the HARQ-ACK with the scheduling request is transmitted is same as a physical resource block where the uplink control information including the HARQ-ACK without the scheduling request is transmitted, and the uplink control information including the HARQ-ACK with the scheduling request is generated using either one of:
the sequence for the uplink control information including the HARQ-ACK with the scheduling request; or
both the sequence for the uplink control information including the HARQ-ACK without the scheduling request and a sequence for the uplink control information including the scheduling request,
in accordance with an operating environment of a terminal.

10. The communication method according to claim 9, wherein the number of bits of the HARQ-ACK is 1 or 2.

11. The communication method according to claim 9, wherein the number of terminals multiplexed in the same physical resource block is up to 6 for the HARQ-ACK with 1 bit.

12. The communication method according to claim 9, wherein the sequence is a sequence including a cyclic shift or a sequence defined by a cyclic shift.

13. The communication method according to claim 9, wherein a sequence for the uplink control information including ACK as the HARQ-ACK is different from a sequence for the uplink control information including NACK as the HARQ-ACK.

14. The communication method according to claim 9, wherein the number of sequences assigned to one terminal is 4 for the HARQ-ACK with 1 bit, and the number of sequences assigned to one terminal is 8 for the HARQ-ACK with 2 bits.

15. The communication method according to claim 9, comprising:
receiving information related to a resource of the PUCCH,
wherein the uplink control information is generated and transmitted based on the information.

16. The communication method according to claim 15, wherein the information includes information related to a cyclic shift used in the sequence.

* * * * *